US012089219B2

(12) United States Patent
Yang et al.

(10) Patent No.: US 12,089,219 B2
(45) Date of Patent: *Sep. 10, 2024

(54) MULTIPLEXING HIGHER PRIORITY AND LOWER PRIORITY UPLINK CONTROL INFORMATION ON A PHYSICAL UPLINK CONTROL CHANNEL

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,112

(22) Filed: Mar. 6, 2023

(65) Prior Publication Data

US 2023/0284228 A1    Sep. 7, 2023

Related U.S. Application Data

(63) Continuation of application No. 17/141,196, filed on Jan. 4, 2021, now Pat. No. 11,617,166.

(51) Int. Cl.
*H04W 72/21*    (2023.01)
*H04L 1/00*    (2006.01)

(52) U.S. Cl.
CPC ........... *H04W 72/21* (2023.01); *H04L 1/0002* (2013.01)

(58) Field of Classification Search
CPC .............................. H04W 72/21; H04L 1/0002
See application file for complete search history.

(56) References Cited

U.S. PATENT DOCUMENTS 9,385,838 B2    7/2016  Hwang et al.
11,362,759 B2    6/2022  Papasakellariou
(Continued)

FOREIGN PATENT DOCUMENTS

| CN | 111314033 A | 6/2020 |
| WO | WO-2020096330 A1 | 5/2020 |
| WO | WO-2020146247 A2 | 7/2020 |

OTHER PUBLICATIONS

CMCC: "Discussion on Remaining Issues of New RNTI for URLLC", 3GPP Draft, R1-1808846, 3GPP TSG RAN WG1 Meeting #94, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20-Aug. 24, 2018, Aug. 11, 2018 (Aug. 11, 2018), XP051516219, 5 Pages, Section 2-B), p. 2-p. 3 p. 5.
(Continued)

*Primary Examiner* — Basil Ma
(74) *Attorney, Agent, or Firm* — Arun Swain

(57) ABSTRACT

Methods, systems, and devices for wireless communication are described. A user equipment (UE) may separately encode lower priority uplink control information (UCI) and higher priority UCI, and multiplex the encoded lower priority UCI and the encoded higher priority UCI on the same physical uplink channel (e.g., a physical uplink control channel (PUCCH)). The UE may be configured with multiple coding rates, which the UE may select from based on a payload size associated with each of the lower priority UCI and the higher priority UCI. Alternatively, the UE may be configured with a separate set of coding rates for the lower priority UCI and a separate set of coding rates for the higher priority UCI. The UE may multiplex the lower priority UCI and the higher priority UCI by mapping to physical uplink channel (Continued)

resources based on an order (e.g., mapping higher priority UCI followed by mapping lower priority UCI).

20 Claims, 15 Drawing Sheets

(56) References Cited

U.S. PATENT DOCUMENTS

| | | | |
|---|---|---|---|
| 11,811,538 B2 | 11/2023 | Papasakellariou | |
| 11,838,914 B2 | 12/2023 | Choi et al. | |
| 11,870,587 B2 | 1/2024 | Yang et al. | |
| 2014/0056273 A1 | 2/2014 | Jang et al. | |
| 2019/0230690 A1 | 7/2019 | Akkarakaran et al. | |
| 2021/0321394 A1 | 10/2021 | Li et al. | |
| 2021/0360610 A1* | 11/2021 | Kim | H04L 5/0094 |
| 2022/0078768 A1 | 3/2022 | El Hamss et al. | |
| 2022/0116953 A1 | 4/2022 | Kim et al. | |
| 2022/0132496 A1 | 4/2022 | Lu et al. | |
| 2022/0217709 A1 | 7/2022 | Yang et al. | |
| 2022/0232487 A1 | 7/2022 | Yang et al. | |
| 2022/0232574 A1* | 7/2022 | Yang | H04L 1/0061 |
| 2022/0369348 A1 | 11/2022 | Huang et al. | |
| 2023/0006776 A1 | 1/2023 | Yang et al. | |
| 2023/0042299 A1 | 2/2023 | Zhou | |
| 2023/0354404 A1 | 11/2023 | Li et al. | |
| 2024/0089970 A1 | 3/2024 | Jung et al. | |

OTHER PUBLICATIONS

International Search Report and Written Opinion—PCT/US2021/072703—ISA/EPO—Mar. 23, 2022.

Moderator (OPPO): "Summary#1 of Email Thread [103-e-NR-IIOT_URLLC_enh-04]", 3GPP TSG RAN WG1 #102-e, R1-2009546, 3rd Generation Partnership Project, Mobile Competence Centre, 650, Route Des Lucioles, F-06921 Sophia-Antipolis Cedex, France, vol. RAN WG1, No. e-Meeting, Aug. 17-Aug. 28, 2020, 96 Pages, Nov. 17, 2020, XP051955615, 96 Pages, page 1 Section 2.3-2.3.5, p. 12-p. 50, p. 12-p. 24.

Qualcomm Incorporated: "Intra-UE Multiplexing and Prioritization for IOT and URLLC", 3GPP TSG RAN WG1 #105-e, R1-2104666, 3rd Generation Partnership Project, Mobile Competence Centre, 650, Route Des Lucioles, F-06921 Sophia-Antipolis Cedex, France, vol. RAN WG1, No. e-Meeting, May 10-May 27, 2021, 27 Pages, May 12, 2021, XP052010917, Sections 2.2.2-2.2.5, p. 7-p. 10 figures 8-10.

VIVO: "Intra-UE Multiplexing/Prioritization for Rel-17 URLLC", 3GPP Draft, R1-2007658, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 24, 2020 (Oct. 24, 2020), XP051946464, 9 p. Section 2, p. 2-p. 6, figure 1, table 1.

Wilus Inc: "Discussion on Intra-UE Multiplexing/Prioritization for URLLC/IIoT", R1-2009248, 3GPP TSG RAN WG1 #103-e, 3GPP, Mobile Competence Centre, 650, Route Des Lucioles, F-06921 Sophia-Antipolis Cedex, France, vol. RAN WG1, No. e-Meeting, Oct. 26-Nov. 13, 2020, Oct. 24, 2020, XP051946912, 6 Pages, Sec. 1, p. 1, 3, paragraph 1-paragraph 2 p. 4, paragraph 5-7 p. 5, paragraph 2-4, Sec. 3, p. 6, p. 1-5, line 16, fig. 1-2, the whole document.

* cited by examiner

MULTIPLEXING HIGHER PRIORITY AND LOWER PRIORITY UPLINK CONTROL INFORMATION ON A PHYSICAL UPLINK CONTROL CHANNEL

CROSS-REFERENCE TO RELATED APPLICATIONS

This application is a continuation of U.S. patent application Ser. No. 17/141,196, filed Jan. 4, 2021, the entire content of which is incorporated herein by reference as if fully set forth below in its entirety and for all applicable purposes.

FIELD OF TECHNOLOGY

The following relates to wireless communication, including multiplexing higher priority and lower priority uplink control information (UCI) on a physical uplink control channel (PUCCH).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be a UE, to separately encode lower priority UCI and higher priority UCI, as well as multiplex the encoded lower priority UCI and the encoded higher priority UCI on a same physical uplink channel (e.g., a physical uplink control channel (PUCCH)). The UE may be configured with multiple coding rates, which the UE may select from based on, for example, a payload size (e.g., a number of bits) associated with the lower priority UCI and a payload size (e.g., a number of bits) associated with the higher priority UCI. In some examples, the payload size associated with the lower priority UCI and the payload size associated with the higher priority UCI may be the same or may be different. Alternatively, the UE may be configured with a separate set of coding rates for the lower priority UCI and a separate set of coding rates for the higher priority UCI. The UE may multiplex the lower priority UCI and the higher priority UCI by mapping to physical uplink channel resources based on an order (e.g., mapping the higher priority UCI followed by mapping the lower priority UCI). The UE may thus be configured to support improvements for transmission of UCI by separately encoding and multiplexing UCI having different priorities. The described techniques may also provide improvements to power consumption and, in some examples, may promote enhanced efficiency for high reliability and low latency uplink operations, among other benefits.

A method for wireless communication at a user equipment (UE) is described. The method may include encoding, based on a configuration, a first set of UCI bits using a first coding rate and a second set of UCI bits using a second coding rate, the first set of UCI bits associated with a first priority and the second set of UCI bits associated with a second priority, multiplexing the encoded first set of UCI bits and the encoded second set of UCI bits to a PUCCH by mapping the encoded first set of UCI bits and the encoded second set of UCI bits to a set of resources, and transmitting the encoded first set of UCI bits and the encoded second set of UCI bits based on the multiplexing.

An apparatus for wireless communication is described. The apparatus may include a processor, memory in electronic communication with the processor, and instructions stored in the memory. The instructions may be executable by the processor to cause the apparatus to encoding, base at least in part on a configuration, a first set of UCI bits using a first coding rate and a second set of UCI bits using a second coding rate, the first set of UCI bits associated with a first priority and the second set of UCI bits associated with a second priority, multiplex the encoded first set of UCI bits and the encoded second set of UCI bits to a PUCCH by mapping the encoded first set of UCI bits and the encoded second set of UCI bits to a set of resources, and transmit the encoded first set of UCI bits and the encoded second set of UCI bits based on the multiplexing.

Another apparatus for wireless communication is described. The apparatus may include means for encoding, based on a configuration, a first set of UCI bits using a first coding rate and a second set of UCI bits using a second coding rate, the first set of UCI bits associated with a first priority and the second set of UCI bits associated with a second priority, means for multiplexing the encoded first set of UCI bits and the encoded second set of UCI bits to a PUCCH by mapping the encoded first set of UCI bits and the encoded second set of UCI bits to a set of resources, and means for transmitting the encoded first set of UCI bits and the encoded second set of UCI bits based on the multiplexing.

A non-transitory computer-readable medium storing code for wireless communication at a UE is described. The code may include instructions executable by a processor to encoding, base at least in part on a configuration, a first set of UCI bits using a first coding rate and a second set of UCI bits using a second coding rate, the first set of UCI bits associated with a first priority and the second set of UCI bits associated with a second priority, multiplex the encoded first set of UCI bits and the encoded second set of UCI bits to a PUCCH by mapping the encoded first set of UCI bits and the encoded second set of UCI bits to a set of resources, and transmit the encoded first set of UCI bits and the encoded second set of UCI bits based on the multiplexing.

Some examples of the method, apparatuses, and non-transitory computer-readable medium described herein may further include operations, features, means, or instructions for receiving a message carrying the configuration, where the configuration includes a set of coding rates for the PUCCH, each coding rate of the set of coding rates associated with the first priority or the second priority, or a combination thereof, selecting, from the set of coding rates, the first coding rate for the first set of UCI bits and the second coding rate for the second set of UCI bits, and where encoding the first set of UCI bits and the second set of UCI bits may be based on the selected first coding rate and the selected second coding rate.

In some examples of the method, apparatuses, and non-transitory computer-readable medium described herein, the set of coding rates includes a first subset of coding rates for the first priority and a second subset of coding rates for the second priority.

In some examples of the method, apparatuses, and non-transitory computer-readable medium described herein, the first subset of coding rates may be different than the second subset of coding rates.

Some examples of the method, apparatuses, and non-transitory computer-readable medium described herein may further include operations, features, means, or instructions for selecting, from the set of coding rates, the first coding rate for the first set of UCI bits, or the second coding rate for the second set of UCI bits, or a combination thereof, based on determining that a payload size of each of the first set of UCI bits and the second set of UCI bits satisfies a threshold payload size, the threshold payload size being less than or equal to 2 bits and where the first set of UCI bits and the second set of UCI bits include hybrid automatic repeat request acknowledgment (HARQ-ACK) bits or scheduling request (SR) bits, or a combination thereof.

Some examples of the method, apparatuses, and non-transitory computer-readable medium described herein may further include operations, features, means, or instructions for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being between 2 bits and 11 bits and where the first set of UCI bits and the second set of UCI bits include HARQ-ACK bits, SR bits, or channel state information (CSI) bits associated with a CSI part 1, or a combination thereof.

Some examples of the method, apparatuses, and non-transitory computer-readable medium described herein may further include operations, features, means, or instructions for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being greater than 11 bits and where the first set of UCI bits and the second set of UCI bits include CSI bits associated with a CSI part 2.

Some examples of the method, apparatuses, and non-transitory computer-readable medium described herein may further include operations, features, means, or instructions for selecting, from the set of coding rates, the first coding rate for the first set of UCI bits or the second coding rate for the second set of UCI bits, or a combination thereof, based on determining that a first payload size of the first set of UCI bits satisfies a first threshold payload size being greater than 11 bits, and second payload size of the second set of UCI bits satisfies a second threshold payload size, the second threshold payload size being greater than 2 bits and less than or equal to 11 bits and where the first set of UCI bits includes HARQ-ACK bits, SR bits, or CSI bits associated with a CSI part 1, or a combination thereof, and the second set of UCI bits include CSI bits associated with a CSI part 2.

Some examples of the method, apparatuses, and non-transitory computer-readable medium described herein may further include operations, features, means, or instructions for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being less than or equal to 2 bits or being greater than 2 bits.

In some examples of the method, apparatuses, and non-transitory computer-readable medium described herein, the message includes a radio resource control message, a medium access control-control element message, or a downlink control information message, or a combination thereof.

In some examples of the method, apparatuses, and non-transitory computer-readable medium described herein, the PUCCH corresponds to a PUCCH resource configured with multiple coding rates.

In some examples of the method, apparatuses, and non-transitory computer-readable medium described herein, the PUCCH corresponds to a PUCCH format including a PUCCH format 2, a PUCCH format 3, or a PUCCH format 4.

Some examples of the method, apparatuses, and non-transitory computer-readable medium described herein may further include operations, features, means, or instructions for determining a total number of uplink resources for the first set of UCI bits and the second set of UCI bits, determining a number of resource blocks based on the total number of uplink resources for the first set of UCI bits and the second set of UCI bits, and where multiplexing the encoded first set of UCI bits and the encoded second set of UCI bits to the PUCCH may be based on the number of resource blocks.

Some examples of the method, apparatuses, and non-transitory computer-readable medium described herein may further include operations, features, means, or instructions for encoding an UCI bit of the first set of UCI bits using a repetition code based on the first coding rate and transmitting the UCI bit, the UCI bit including a HARQ-ACK bit or a SR bit.

Some examples of the method, apparatuses, and non-transitory computer-readable medium described herein may further include operations, features, means, or instructions for multiplexing two UCI bits of the first set of UCI bits associated with the first priority with one or more UCI bits of the second set of UCI bits associated with the second priority, encoding the two UCI bits of the first set of UCI bits using a simplex code, repeating the simplex encoded two UCI bits based on the first coding rate, and transmitting the two UCI bits of the first set of UCI bits, the two UCI bits including HARQ-ACK bits or SR bits, or a combination thereof.

In some examples of the method, apparatuses, and non-transitory computer-readable medium described herein, encoding the first set of UCI bits and the second set of UCI bits may include operations, features, means, or instructions for separately encoding the first set of UCI bits using the first coding rate and the second set of UCI bits using the second coding rate different than the first coding rate based on an encoding rule identifying an encoding order.

In some examples of the method, apparatuses, and non-transitory computer-readable medium described herein, the first set of UCI bits and the second set of UCI bits includes a set of HARQ-ACK bits, a set of SR bits, a first set of CSI bits associated with a CSI part 1, or a second set of CSI bits associated with a CSI part 2, or a combination thereof.

In some examples of the method, apparatuses, and non-transitory computer-readable medium described herein, separately encoding a first subset of UCI bits of the first set of UCI bits associated with the first priority and a second subset of UCI bits of the second set of UCI bits associated with the second priority based on an encoding rule and where the first subset of UCI bits and the second subset of UCI bits includes HARQ-ACK bits, SR bits, CSI bits associated with a CSI part 1, or a combination thereof.

In some examples of the method, apparatuses, and non-transitory computer-readable medium described herein, separately encoding a third subset of UCI bits of the first set of UCI bits associated with the first priority and where the third subset of UCI bits includes CSI bits associated with a CSI part 2.

Some examples of the method, apparatuses, and non-transitory computer-readable medium described herein may further include operations, features, means, or instructions for determining one or more resources of a set of resources associated with the PUCCH for each of the encoded first subset of UCI bits, the encoded second subset of UCI bits, and the encoded third subset of UCI bits and mapping the encoded first subset of UCI bits, the encoded second subset of UCI bits, and the encoded third subset of UCI bits, to the set of resources associated with the PUCCH based on a resource mapping rule.

In some examples of the method, apparatuses, and non-transitory computer-readable medium described herein, the encoded first subset of UCI bits, the encoded second subset of UCI bits, and the encoded third subset of UCI bits may be mapped in a contiguous order.

In some examples of the method, apparatuses, and non-transitory computer-readable medium described herein, the encoded first subset of UCI bits, the encoded second subset of UCI bits, and the encoded third subset of UCI bits may be mapped in a noncontiguous order.

Some examples of the method, apparatuses, and non-transitory computer-readable medium described herein may further include operations, features, means, or instructions for determining a first uplink resource of the set of resources associated with a demodulation reference signal and mapping the first set of UCI bits to a second uplink resource adjacent to the first uplink resource associated with the demodulation reference signal.

In some examples of the method, apparatuses, and non-transitory computer-readable medium described herein, the first uplink resource and the second uplink resource may be contiguous in a time domain, or a frequency domain, or a combination thereof and the first uplink resource may be nonadjacent to a third uplink resource associated with the second set of UCI bits.

In some examples of the method, apparatuses, and non-transitory computer-readable medium described herein, the first uplink resource and the third uplink resource may be noncontiguous in a time domain, or a frequency domain, or a combination thereof.

Some examples of the method, apparatuses, and non-transitory computer-readable medium described herein may further include operations, features, means, or instructions for determining that the PUCCH may be scheduled with frequency hopping including at least two frequency hops and mapping the encoded first set of UCI bits to both a first frequency hop and a second frequency hop of the at least two frequency hops.

In some examples of the method, apparatuses, and non-transitory computer-readable medium described herein, uniformly mapping the encoded first set of UCI bits to both the first frequency hop and the second frequency hop of the at least two frequency hops using the same number of resources or substantially the same number of resources for the first frequency hop and the second frequency hop.

A method for wireless communication at a base station is described. The method may include transmitting, to a UE, a configuration including a set of coding rates for encoding UCI bits, each coding rate of the set of coding rates associated with a first priority, or a second priority, or a combination thereof, receiving, from the UE via a PUCCH, an encoded first set of UCI bits associated with the first priority and an encoded second set of UCI bits associated with the second priority, and decoding the encoded first set of UCI bits using a first coding rate and the encoded second set of UCI bits using a second coding rate based on the configuration.

An apparatus for wireless communication is described. The apparatus may include a processor, memory in electronic communication with the processor, and instructions stored in the memory. The instructions may be executable by the processor to cause the apparatus to transmit, to a UE, a configuration including a set of coding rates for encoding UCI bits, each coding rate of the set of coding rates associated with a first priority, or a second priority, or a combination thereof, receive, from the UE via a PUCCH, an encoded first set of UCI bits associated with the first priority and an encoded second set of UCI bits associated with the second priority, and decode the encoded first set of UCI bits using a first coding rate and the encoded second set of UCI bits using a second coding rate based on the configuration.

Another apparatus for wireless communication is described. The apparatus may include means for transmitting, to a UE, a configuration including a set of coding rates for encoding UCI bits, each coding rate of the set of coding rates associated with a first priority, or a second priority, or a combination thereof, means for receiving, from the UE via a PUCCH, an encoded first set of UCI bits associated with the first priority and an encoded second set of UCI bits associated with the second priority, and means for decoding the encoded first set of UCI bits using a first coding rate and the encoded second set of UCI bits using a second coding rate based on the configuration.

A non-transitory computer-readable medium storing code for wireless communication at a base station is described. The code may include instructions executable by a processor to transmit, to a UE, a configuration including a set of coding rates for encoding UCI bits, each coding rate of the set of coding rates associated with a first priority, or a second priority, or a combination thereof, receive, from the UE via a PUCCH, an encoded first set of UCI bits associated with the first priority and an encoded second set of UCI bits associated with the second priority, and decode the encoded first set of UCI bits using a first coding rate and the encoded second set of UCI bits using a second coding rate based on the configuration.

DETAILED DESCRIPTION

Figure 1:
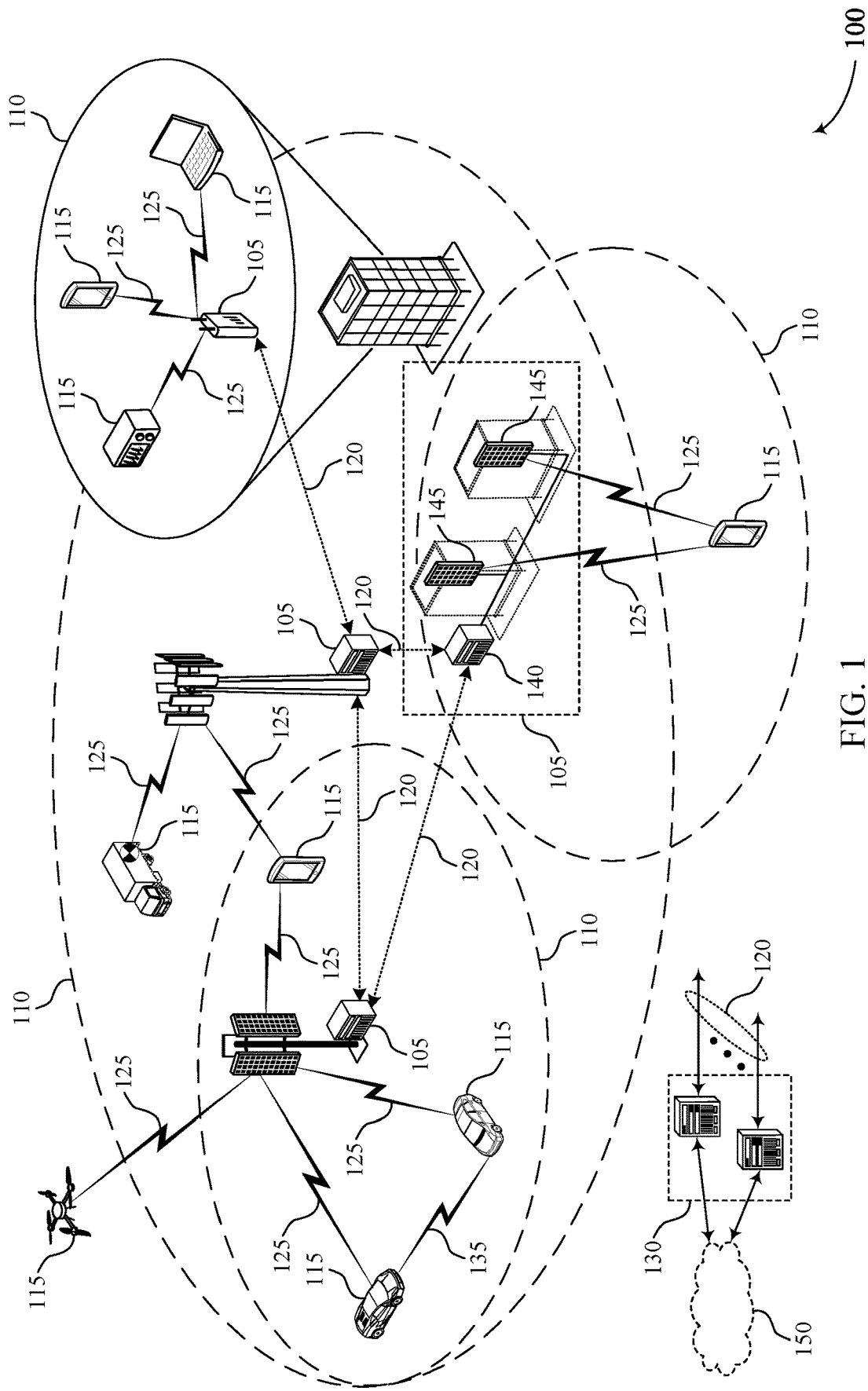
FIGS. 1 and 2 illustrate examples of wireless communications systems that support multiplexing higher priority and lower priority uplink control information (UCI) on a physical uplink control channel (PUCCH) in accordance with aspects of the present disclosure.

A wireless communications system may include various communication devices such as a user equipment (UE) and a base station, which may provide wireless communication services to the UE. For example, such a base station may be a next-generation NodeB (referred to as a gNB) that may support multiple radio access technologies including 4G systems, such as 4G LTE, as well as 5G systems, which may be referred to as 5G NR. In the wireless communications system, the UE may transmit an uplink message carrying uplink control information (UCI) to support various uplink operations. For example, the UCI may, in some examples, convey various information including feedback information (e.g., hybrid automatic repeat request acknowledgment (HARQ-ACK), scheduling information (e.g., scheduling requests (SR)), or channel information (e.g., channel state information (CSI)), any combination. In some cases, different UCI may have different priorities (e.g., a first UCI may have a higher priority, a second UCI may have a lower priority).

The UE may encode and transmit one or more UCIs on a physical uplink channel, such as a physical uplink control channel (PUCCH) or a physical uplink shared channel (PUSCH). In some cases, the UE may multiplex both a higher priority UCI and a lower priority UCI on the same physical uplink channel, for example, a PUCCH. In the wireless communications system, the UE may experience interference, which may impact transmission of UCI. In some cases, the UE may drop the lower priority UCI when experiencing interference with a higher priority UCI (e.g., carried on a PUSCH). As a result, the UE may have to retransmit at least some of the UCIs, which may result in added latency and power consumption, among other disadvantages. Therefore, it may be desirable to better protect the higher priority UCI compared to the lower priority UCI, but at the same time avoid dropping the lower priority UCI. As described herein, various wireless communication systems and devices may implement two levels of priority in some examples (e.g., a high level of priority and a low level of priority) or more than two levels of priority in some examples (e.g., a highest level of priority, a middle level of priority, and a lowest level of priority), among other examples.

To address the above shortcomings, various aspects of the present disclosure relate to configuring the UE to separately encode the lower priority UCI and the higher priority UCI. Additionally, the UE may be configured to multiplex the encoded lower priority UCI and the encoded higher priority UCI on the same physical uplink channel (e.g., PUCCH). The UE may separately encode the lower priority UCI and the higher priority UCI using different coding rates. Alternatively, the UE may separately encode the lower priority UCI and the higher priority UCI using the same coding rate. In some examples, the UE may be configured with multiple coding rates, which the UE may select from based on, for example, a payload size associated with the lower priority UCI and a payload size associated with the higher priority UCI. Alternatively, the UE may be configured with a separate set of coding rates for the lower priority UCI and a separate set of coding rates for the higher priority UCI.

By way of example, the UE may encode the lower priority UCI and the higher priority UCI using a particular coding rate (e.g., a first coding rate) when the payload size is, for example, less than or equal to 2 bits. In some other examples, the UE may encode the lower priority UCI and the higher priority UCI using a particular coding rate (e.g., a second coding rate) when the payload size is, for example, between 2 and 11 bits. In other examples, the UE may encode the lower priority UCI and the higher priority UCI using a particular coding rate (e.g., a third coding rate) when the payload size is, for example, greater than 11 bits. Additionally or alternatively, the UE encode the lower priority UCI and the higher priority UCI using a particular coding rate (e.g., a fourth or fifth coding rate) when the payload size is, for example, less than or equal to 11 bits, or greater than 11 bits.

The UE may multiplex the lower priority UCI and the higher priority UCI by mapping to physical uplink channel resources (e.g., PUCCH resources) based on an order. The UE may, for example, map higher priority UCI to corresponding resources followed by mapping lower priority UCI to corresponding resources. The UE may also determine the physical uplink channel resources to be used by different types of UCI. In some examples, the UE may map a first type of UCI (e.g., HARQ-ACK, SR, CSI part-1) having a higher priority and then map a first type of UCI (e.g., HARQ-ACK, SR, CSI part-1) having a lower priority. Additionally or alternatively, the UE may map a second type of UCI (e.g., CSI part-2) having a higher priority and then map a second type of UCI (e.g., CSI part-2) having a lower priority. In some other examples, the UE may map a first type of UCI (e.g., HARQ-ACK, SR, CSI part-1) having a higher priority followed by a second type of UCI (e.g., CSI part-2) having a higher priority, and then map a first type of UCI (e.g., HARQ-ACK, SR, CSI part-1) having a lower priority followed by a second type of UCI (e.g., CSI part-2) having a lower priority. Additionally, when the UE maps the lower priority UCI and the higher priority UCI, the UE may map the higher priority UCI closer to a demodulation reference signal (DMRS) resource than the lower priority UCI.

Aspects of the present disclosure may be implemented to realize one or more of the following potential advantages or improvements, among others. The present disclosure may provide benefits and enhancements to the operation of the UE. For example, operations performed by the UE may provide improvements to UCI transmissions. By configuring the UE to separately encode lower priority UCI and higher priority UCI, the UE may avoid retransmissions of some UCI because the lower priority UCI and higher priority UCI are separately protected. In some examples, configuring the UE to support multiplexing the separately encoded lower priority UCI and higher priority UCI may support improvements in power savings for the UE. For example, the UE may increase its battery life by providing efficient uplink transmissions of UCI in the wireless communications system.

Aspects of the disclosure are initially described in the context of wireless communications systems. Aspects of the disclosure are further illustrated by and described with reference to apparatus diagrams, system diagrams, and flowcharts that relate to multiplexing higher priority and lower priority UCI on a PUCCH.

FIG. 1 illustrates an example of a wireless communications system 100 that supports multiplexing higher priority and lower priority UCI on a PUCCH in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may transmit, to a base station 105 or other UEs 115, control information and data. For example, a UE 115 may transmit one or more UCIs on a PUCCH and uplink data on a PUSCH. The UCI may convey information including channel information, feedback information, or scheduling information, or a combination thereof. The channel information may be CSI, which may include a channel quality indication (CQI), a precoding matrix indicator (PMI), or a rank indicator (RI), or a combination thereof. The feedback information may include acknowledgment (ACK), no-acknowledgment (NACK), or HARQ-feedback (e.g., HARQ-ACK). The scheduling information may include uplink SRs.

The UE 115 may encode and multiplex the UCI, and transmit the UCI on a physical uplink channel, such as a PUCCH or a PUSCH. The UE 115 may jointly encode UCI, such as HARQ-ACK, SR, or CSI part-1. The UE 115 may separately encode a CSI part-2 from other UCI, such as HARQ-ACK, SR, or CSI part-1, for example, because the payload size of the CSI part-2 may be dependent on the payload size of the CSI part-1. The UE 115 may encode the UCI including HARQ-ACK, SR, CSI part-1, and the CSI part-2 using the same coding rate. Different UCI may also have different priorities (e.g., a higher priority, a lower priority). The UE 115 may thereby encode a higher priority UCI and a lower priority UCI using different coding rates or the same coding rate, as described herein.

The UE 115 may multiplex both a higher priority UCI and a lower priority UCI on the same physical uplink channel, for example, a PUCCH. A PUCCH may be associated with a PUCCH format. The UE 115 may be configured to use different PUCCH formats for different payload sizes carrying UCI bits. In some examples, the UE 115 may use a PUCCH format 0 or a PUCCH format 1 based on a payload size being 1 or 2 bits. In some other examples, the UE 115 may use a PUCCH format 2, a PUCCH format 3, or a PUCCH format 4 based on a payload size being more than 2 bits. Therefore, the UE 115 may determine and select a PUCCH format based on a total number of UCI bits. The UE 115 may determine a total number of resource blocks available for an uplink transmission of UCI, for example, on a PUCCH having a particular PUCCH format (e.g., a PUCCH format 2 or a PUCCH format 3) based on a total UCI payload, or a coding rate (e.g., a given coding rate or a max coding rate), or both. The UE 115 may determine the total number of resource blocks available for the uplink transmission of the UCI, for example, according to Equation (1):

$$N_{RB} = \min\left(\left\lceil \frac{K}{R * N_{RE}^{RB} * Q_m} \right\rceil, RB_{max}\right) \quad (1)$$

where $N_{RE}^{RB}$ denotes the total number of available resources elements per resource block (e.g., across all configured time resources (such as, orthogonal frequency division multiplex (OFDM) symbols)), R denotes the coding rate, $Q_m$ denotes the modulation order, and K denotes the number of UCI bits.

Various aspects of the present disclosure relate to configuring the UE 115 to separately encode the lower priority UCI and the higher priority UCI. A PUSCH or a PUCCH transmission, including repetitions if any, may correspond to a priority index 0 or a priority index 1. In some examples, a low priority UCI may correspond to a priority index 0, while a high priority UCI may correspond to a priority index 1. In some examples, for a configured grant PUSCH transmission, a UE 115 may determine a priority index from priority information, if provided. For a PUCCH transmission with HARQ-ACK information corresponding to a semi-persistent scheduled (SPS) PDSCH reception or a SPS PDSCH release, a UE 115 may determine a priority index from a preconfigured parameter, if provided. For a PUCCH transmission with SR, a UE 115 may determine the corresponding priority from a preconfigured parameter. For a PUSCH transmission with semi-persistent CSI report, a UE 115 may determine a priority index from a priority indicator field, if provided, in a DCI format 0_1 or a DCI format 0_2 that activates the semi-persistent CSI report. If a priority index is not provided to a UE 115 for a PUSCH or a PUCCH transmission, the priority index may be 0.

Additionally, the UE 115 may be configured to multiplex the encoded lower priority UCI and the encoded higher priority UCI on the same physical uplink channel (e.g., PUCCH). The UE 115 may separately encode the lower priority UCI and the higher priority UCI using different coding rates. Alternatively, the UE 115 may separately encode the lower priority UCI and the higher priority UCI using the same coding rate. In some examples, the UE may be configured with multiple coding rates, which the UE 115 may select from based on, for example, a payload size associated with each of the lower priority UCI and the higher priority UCI, as described herein. Alternatively, the UE 115 may be configured with a separate set of coding rates for the lower priority UCI and a separate set of coding rates for the higher priority UCI.

The UE 115 may thereby determine the total number of resource blocks available for the uplink transmission of the lower priority UCI and the higher priority UCI, for example, according to Equation (2):

$$N_{RB} = \min\left(\left\lceil \left(\frac{K_1}{R_1} + \frac{K_2}{R_2}\right) / (N_{RE}^{RB} * Q_m) \right\rceil, RB_{max}\right) \quad (2)$$

where $N_{RE}^{RB}$ denotes the total number of available resources elements per resource block (e.g., across all configured time resources (such as, OFDM symbols)), $R_1$ denotes the respective coding rate for the lower priority UCI, $R_2$ denotes the respective coding rate for the higher priority UCI, $Q_m$ denotes the modulation order, $K_1$ denotes the number of UCI bits for the lower priority UCI, and $K_2$ denotes the number of UCI bits for and the higher priority UCI. The UE 115 may thus be configured to support improvements to transmission of UCI by separately encoding and multiplexing UCI having different priorities. The UE 115 may also experience improved power savings and, in some examples, may promote enhanced efficiency for higher reliability and lower latency UCI transmissions, among other benefits.

Figure 2:
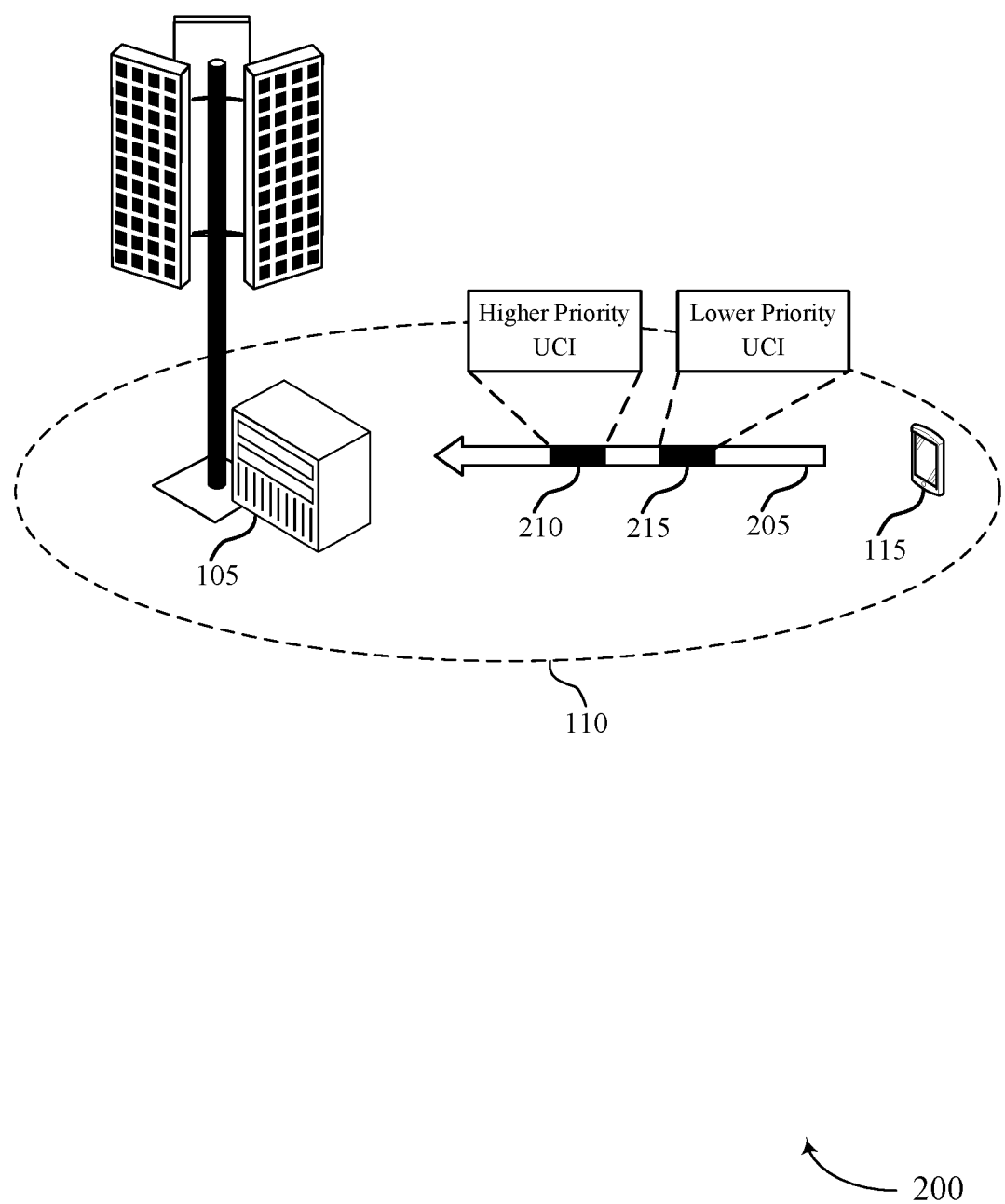

FIG. 2 illustrates an example of a wireless communications system 200 that supports multiplexing higher priority and lower priority UCI on a PUCCH in accordance with aspects of the present disclosure. In some examples, the wireless communications system 200 may implement aspects of the wireless communications system 100 or may be implemented by aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency UCI operations, among other benefits.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations.

Additionally or alternatively, an antenna panel may support radio frequency beamforming for a signal transmitted via one or more antenna ports. The base station 105 and the UE 115 may thus be configured to support directional communications using the multiple antennas.

The UE 115, in the wireless communications system 200, may support operations to preserve resources (for example, time and frequency resources of the wireless communications system 200) or a battery life of the UE 115, among other examples. In some examples, the UE 115 may be configured to support UCI operations to manage or improve directional communications between the base station 105 and the UE 115. For example, the UE 115 may transmit an uplink message carrying a UCI to support various uplink operations. For example, the UCI may convey various information including feedback information (e.g., HARQ-ACK, scheduling information (e.g., SR), or channel information (e.g., CSI) used to manage or improve directional communications between the base station 105 and the UE 115), or any combination thereof. In some cases, different UCI may have different priorities (e.g., a first UCI may have a higher priority, a second UCI may have a second lower priority).

The UE 115 may encode and transmit the UCI on a physical uplink channel, such as a PUCCH 205 or a PUSCH. In some cases, the UE 115 may multiplex both a higher priority UCI 210 and a lower priority UCI 215 on the same physical uplink channel, for example, the PUCCH 205. In the wireless communications system 200, the UE 115 may experience interference, which may impact transmission of UCI. In some cases, the UE 115 may drop a lower priority UCI because the UE 115 might not be able to transmit two uplink transmission at the same time (e.g., both a low priority UCI and a high priority UCI). As a result, the UE 115 may have to retransmit at least some of the UCIs, which may result in added latency and power consumption, among other disadvantages. Therefore, it may be desirable to better protect the higher priority UCI compared to the lower priority UCI, but at the same time avoid dropping the lower priority UCI.

The UE 115 may be configured to separately encode the higher priority UCI 210 and the lower priority UCI 215. Additionally, the UE 115 may be configured to multiplex the encoded higher priority UCI 210 and the encoded lower priority UCI 215 on the same physical uplink channel (e.g., the PUCCH 205). The UE 115 may separately encode the higher priority UCI 210 and the lower priority UCI 215 using different coding rates. Alternatively, the UE 115 may separately encode the higher priority UCI 210 and the lower priority UCI 215 using the same coding rate. In some examples, the UE 115 may be configured with multiple coding rates (e.g., via an RRC configuration message), which the UE 115 may select from based on, for example, a payload size associated with each of the higher priority UCI 210 and the lower priority UCI 215. Alternatively, the UE 115 may be configured with a separate set of coding rates for the higher priority UCI 210 and a separate set of coding rates for the lower priority UCI 215.

The base station 105 may configure multiple coding rates to be used by the UE 115, for example, for one or more PUCCH resources associated with the PUCCH 205. In some examples, the base station 105 may configure multiple coding rates based on the PUCCH 205 being associated with a particular PUCCH format (e.g., PUCCH format 2 or a PUCCH format 3). By way of example, the UE 115 may encode the higher priority UCI 210 and the lower priority UCI 215 using a particular coding rate (e.g., a first coding rate) when the payload size is, for example, less than or equal to 2 bits (UCI bits ≤2 bits). In some other examples, the UE 115 may encode the higher priority UCI 210 and the lower priority UCI 215 using a particular coding rate (e.g., a second coding rate) when the payload size is, for example, between 2 and 11 bits (2 bits≤UCI bits≤11 bits). In other examples, the UE 115 may encode the higher priority UCI 210 and the lower priority UCI 215 using a particular coding rate (e.g., a third coding rate) when the payload size is, for example, greater than 11 bits (UCI bits>11 bits). Additionally or alternatively, the UE 115 may encode the higher priority UCI 210 and the lower priority UCI 215 using a particular coding rate (e.g., a fourth or fifth coding rate) when the payload size is, for example, less than or equal to 11 bits (UCI bits≤11 bits), or greater than 11 bits (UCI bits>11 bits). In some examples, UCI including HARQ-ACK, SR, CSI part-1 and CSI part-2 of the same priority (e.g., a low priority or a high priority) and the same payload range (e.g., 2 bits<K≤11 bits, or K>11 bits, or K>2 bits) may be encoded with different coding rates.

The base station 105 may configure at least two sets of coding rates, one set for the higher priority UCI 210 and a second set for the lower priority UCI 215. Each of these sets may include one or more of the example coding rates. In some examples, the base station 105 may configure two coding rates either for a given priority (e.g., a higher priority, a lower priority) or across both priorities (e.g., both a higher priority and a lower priority). For example, the UE 115 may encode the higher priority UCI 210 or the lower priority UCI 215, or both, using a particular coding rate (e.g., a first coding rate) when the payload size is, for example, less than or equal to 2 bits (UCI bits≤2 bits). The UE 115 may encode the higher priority UCI 210 and the lower priority UCI 215 using a particular coding rate (e.g., a second coding rate) when the payload size is, for example, greater than 2 bits (UCI bits>2 bits), where these UCI bits include all available UCIs of the same priority.

The base station 105 may configure one or more of the above example coding rates for a PUCCH resource used to convey the multiplexed high priority UCI 210 and the low priority UCI 215. For example, the base station 105 may configure both sets of coding rates for a PUCCH resource, and the UE 115 may use the PUCCH resource to convey multiplexed high priority UCI 210 and low priority UCI 215 (e.g., multiplexed high priority HARQ-ACK and low priority HARQ-ACK). One or more of the above example coding rates for the high priority UCI 210 may be configured for a high priority PUCCH resource, and one or more of the above example coding rates for the low priority UCI 215 may be configured for a low priority PUCCH resource. The UE 115 may determine one or more of the above example coding rates for the high priority UCI 210 and the low priority UCI 215 from the corresponding PUCCH resources that were scheduled to transmit the high priority UCI 210 and the low priority UCI 215, respectively.

In some examples, if the high priority UCI 210 is scheduled on a first PUCCH resource, the low priority UCI 215 is scheduled on a second PUCCH resource, and the first PUCCH resource and the second PUCCH resource overlap in a time domain (e.g., symbol, slot, etc.), the UE 115 may multiplex the high priority UCI 210 and the low priority UCI 215 on a third PUCCH resource. The third PUCCH resource may be one of the first PUCCH resource or the second PUCCH resource. Alternatively, the third PUCCH resource may be a different resource from the first PUCCH resource and the second PUCCH resource. The UE 115 may determine the coding rate for the high priority UCI 210 and the low priority UCI 215 based on the coding rate configured for the first PUCCH resource and the second PUCCH resource, respectively. As such, the base station 105 does not have to configure two sets of coding rate for a single PUCCH resource.

The PUCCH 205 may be associated with a particular PUCCH format, for example, a PUCCH format 2, a PUCCH format 3, or a PUCCH format 4. In some examples, as described herein, if a total number of UCI bits associated with the higher priority UCI 210 or the lower priority UCI 215, or both, is greater than 2 bits, the UE 115 may transmit the multiplexed UCI payload on a PUCCH with a PUCCH format 2, a PUCCH format 3, or a PUCCH format 4. In some examples, based on a corresponding UCI payload and a configured coding rate, the UE 115 may determine a number of resources to use for the higher priority UCI 210 and the lower priority UCI 215, and then determine the overall number of resource blocks based on the total number of resources for the higher priority UCI 210 and the lower priority UCI 215. The UE 115 may multiplex the higher priority UCI 210 and the lower priority UCI 215 by mapping to physical uplink channel resources (e.g., PUCCH resources) based on an order. When the UE 115 maps the higher priority UCI 210 and the lower priority UCI 215, the UE 115 may map the higher priority UCI 210 closer to a DMRS resource compared to the lower priority UCI 215, as described in more detail in FIGS. 3A and 3B.

The UE 115 may, for example, map the higher priority UCI 210 to corresponding resources followed by mapping the lower priority UCI 215 to corresponding resources. The UE 115 may also determine the physical uplink channel resources to be used by different types of UCI. In some examples, the UE 115 may map a first type of UCI (e.g., a HARQ-ACK, an SR, a CSI part-1) having a higher priority and then map a second type of UCI (e.g., a HARQ-ACK, an SR, a CSI part-1) having a lower priority. Additionally or alternatively, the UE 115 may map a third type of UCI (e.g., a CSI part-2) having a higher priority and then map a fourth type of UCI (e.g., a CSI part-2) having a lower priority. Thus, the mapping order may be (1) a higher priority HARQ-ACK, SR, and CSI part-1, (2) a lower priority HARQ-ACK, SR, and CSI part-1, (3) a higher priority CSI part-2, and (4) a lower priority CSI part-2. In some other examples, the UE 115 may map a first type of UCI (e.g., HARQ-ACK, SR, CSI part-1) having a higher priority followed by a third type of UCI (e.g., CSI part-2) having a higher priority, and then map a second type of UCI (e.g., HARQ-ACK, SR, CSI part-1) having a lower priority followed by a fourth type of UCI (e.g., CSI part-2) having a lower priority. Thus, the mapping order may be (1) a higher priority HARQ-ACK, SR, and CSI part-1, (3) a higher priority CSI part-2, (2) a lower priority HARQ-ACK, SR, and CSI part-1, and (4) a lower priority CSI part-2.

The example multiplexing orders above mean that, when the total number of resources on the PUCCH 205 are limited (e.g., the total number of resources on the PUCCH 205 are less than the total number of resources required to transmit the multiplexed high priority UCI 210 and the low priority UCI 215), the UE 115 may drop one or more UCIs beginning from the last UCI type in the order, up to the first UCI type in the order. For example, for the mapping order of (1) a higher priority HARQ-ACK, SR, and CSI part-1, (2) a lower priority HARQ-ACK, SR, and CSI part-1, (3) a higher priority CSI part-2, and (4) a lower priority CSI part-2, the UE 115 may first drop (4) the lower priority CSI part-2, followed by (3) the higher priority CSI part-2, and so on. In another example, for the mapping order of (1) a higher priority HARQ-ACK, SR, and CSI part-1, (3) a higher priority CSI part-2, (2) a lower priority HARQ-ACK, SR, and CSI part-1, and (4) a lower priority CSI part-2, the UE 115 may first drop (4) the lower priority CSI part-2, followed by (2) the lower priority HARQ-ACK, SR, and CSI part-1, and so on.

The higher priority UCI 210 or the lower priority UCI 215 may include 1 to 2 UCI bits. In some cases, if the UE 115 is to (e.g., has to) multiplex 1 to 2 higher priority UCI bits (e.g., a higher priority HARQ-ACK) with one or more lower priority UCI bits (e.g., a lower priority UCI including ≥1 UCI bit), or if the UE 115 is to (e.g., has to) multiplex 1 to 2 lower priority UCI bits (e.g., lower priority HARQ-ACK) with more than one or more higher priority UCI bits (≥1 UCI bit), then the UE 115 may encode the 1 to 2 UCI bits HARQ-ACK as follows: if only 1 HARQ-ACK bit is transmitted for a given priority, the UE 115 may repeat the HARQ-ACK bits L times according to the configured coding rate. Otherwise, if 2 HARQ-ACK bits are transmitted for a given priority, the UE may encode the 2 HARQ-ACK bits using a simplex code by encoding the two bits [a0,a1] to [a0,a1,a0+a1], and then performing repetition (e.g., continue to encode the 2 HARQ-ACK bits) until the coding rate reaches the configured value. Here, a0+a1 means the modulo two sum of the bits a0 and a1. The UE 115 may apply the simplex coding to 2 HARQ-ACK bits on the PUCCH 205 when multiplexing the 2 HARQ-ACK bits with other UCI. Thus, one or two HARQ-ACK bits associated with the first priority (e.g., high priority) may be multiplexed with UCI of a second priority (e.g., a low priority). The UCI of the second priority can be more than 2 bits, it can also be one or two bits. That is, as long as the total payload of the high priority UCI 210 and the low priority UCI 215 exceeds 2 bits.

In the wireless communication system 200, the UE 115 may thus be configured to support improvements for transmission of UCI by separately encoding and multiplexing UCI having different priorities. The UE 115 may also provide improvements to power consumption and, in some examples, may promote enhanced efficiency for higher reliability and lower latency UCI transmissions (e.g., transmission of the higher priority UCI 210 and the lower priority UCI 215) in the wireless communication system 200.

Figure 3A:
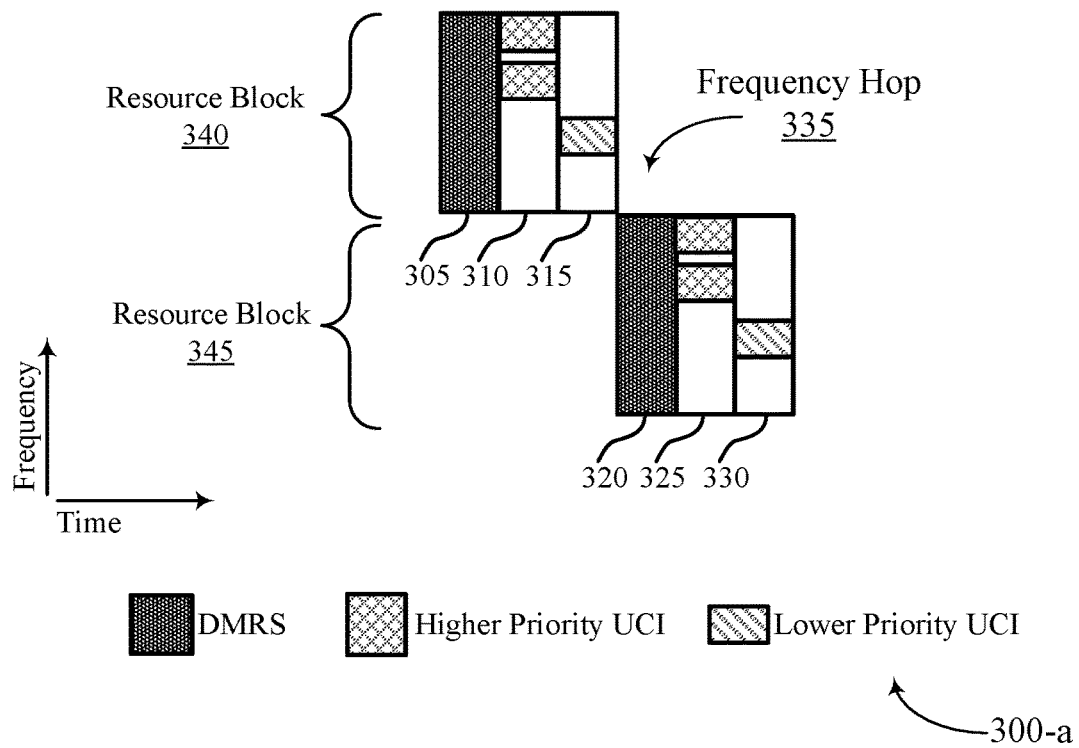
FIGS. 3A and 3B illustrate examples of resource mapping schemes that support multiplexing higher priority and lower priority UCI on a PUCCH in accordance with aspects of the present disclosure.

FIG. 3A illustrates an example of a resource mapping scheme 300-a that supports multiplexing higher priority and lower priority UCI on a PUCCH in accordance with aspects of the present disclosure. The resource mapping scheme 300-a may be implemented by aspects of the wireless communications systems 100 and 200 or may implement aspects of the wireless communications systems 100 and 200 as described with reference to FIGS. 1 and 2, respectively. For example, the resource mapping scheme 300-a may be implemented by a UE 115, as described with reference to FIGS. 1 and 2. The resource mapping scheme 300-a may be implemented by the UE 115 to map PUCCH resources to improve efficiency and resource usage for uplink transmissions carrying UCI and promote higher reliability for the uplink transmissions carrying the UCI, among other benefits.

In the example of FIG. 3A, the resource mapping scheme 300-a may correspond to time resources (e.g., a symbol duration, a minislot duration, a slot duration, a subframe duration, a frame duration), as well as frequency resources (e.g., subcarriers, carriers) for a physical uplink channel, such as a PUCCH. A UE 115 may transmit control information, data, among other information (e.g., reference signals, such as DMRS) using one or more time resources and frequency resources. With reference to FIG. 3A, the time resources may include symbols periods 305, 310, 315, 320, 325, and 330 (e.g., OFDM symbols) in a time domain, and the frequency resources may include resource blocks 340 and 345 in a frequency domain. Additionally, the resource mapping scheme 300-*a* may include a frequency hop 335, for example, from the resource block 340 (e.g., having a first frequency) to the resource block 345 (e.g., having a second frequency). In some examples, the UE 115 may uniformly map the encoded higher priority UCI or the encoded lower priority UCI, or both, to at least some if not all of the hops of the frequency hop 335. For example, the UE 115 may uniformly map the encoded higher priority UCI, or the encoded lower priority UCI, or both, to at least some if not all of the at least two frequency hops (e.g., resource blocks 340, 345) using the same number of resources or substantially the same number of resources for the first frequency hop (e.g., associated with the resource block 340) and the second frequency hop (e.g., associated with the resource block 345).

The UE 115 may map an encoded higher priority UCI and an encoded lower priority UCI to one or more resources according to the resource mapping scheme 300-*a*. In some examples, the UE 115 may map the encoded higher priority UCI and the encoded lower priority UCI based on a rule. For example, the rule may instruct the UE 115 that when mapping the encoded higher priority UCI and the encoded lower priority UCI to physical uplink channel (e.g., a PUCCH) resources, the UE 115 may map the encoded higher priority UCI closer to the DMRS than the encoded lower priority UCI. In the example of FIG. 3A, the frequency hop 335 may include 3 symbol periods (e.g., symbol periods 305, 310, and 315 and symbol periods 320, 325, and 330). The symbols periods 305 and 320 may each carry a DMRS, and the UE 115 may thereby map the encoded higher priority UCI on the symbol periods 310 and 325 (e.g., relatively closest to the DMRS), and map the encoded lower priority UCI on one or more remaining available resources (e.g., symbol periods 315 and 330).

The symbol period 305 carrying DMRS, the symbol period 310 carrying the encoded higher priority UCI, the symbol period 320 carrying DMRS, and the symbol period 325 carrying the encoded higher priority UCI may be contiguous in a time domain or a frequency domain, or both. Alternatively, the symbol period 305 carrying DMRS, the symbol period 310 carrying the encoded higher priority UCI, the symbol period 320 carrying DMRS, and the symbol period 325 carrying the encoded higher priority UCI may be noncontiguous in a time domain or a frequency domain, or both. The symbol period 310 carrying the encoded higher priority UCI, the symbol period 315 carrying the encoded lower priority UCI, the symbol period 325 carrying the encoded higher priority UCI, and the symbol 330 carrying the encoded lower priority UCI may be contiguous in a time domain or a frequency domain, or both. Alternatively, the symbol period 310 carrying the encoded higher priority UCI, the symbol period 315 carrying the encoded lower priority UCI, the symbol period 325 carrying the encoded higher priority UCI, and the symbol 330 carrying the encoded lower priority UCI may be noncontiguous in a time domain or a frequency domain, or both.

Figure 3B:
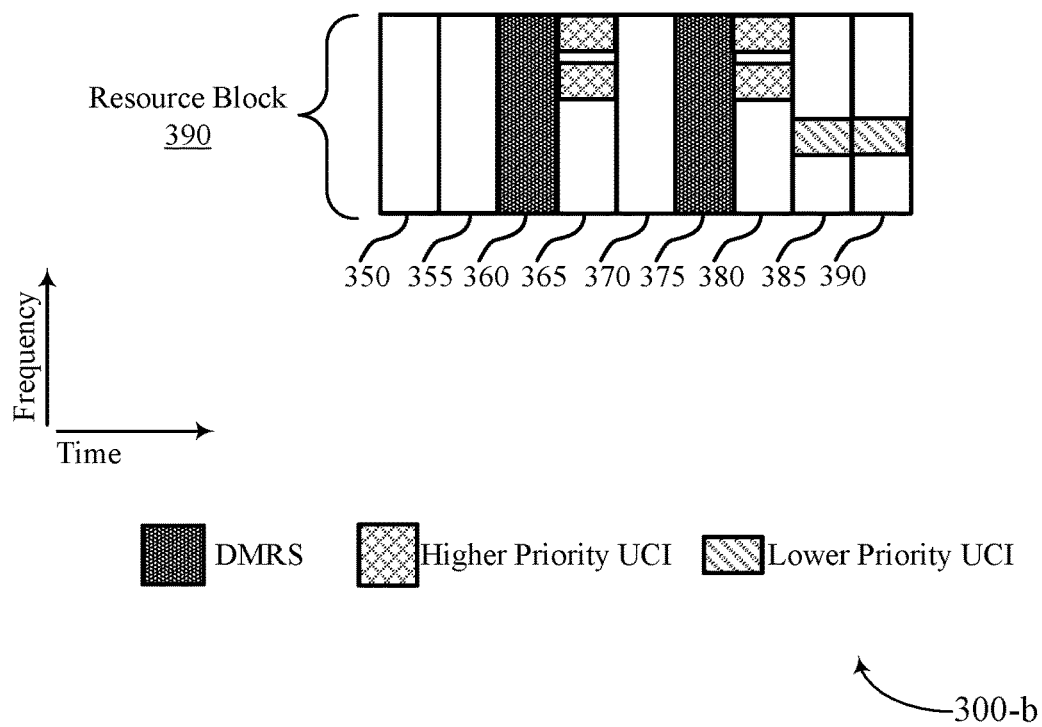

FIG. 3B illustrates an example of a resource mapping scheme 300-*a* that supports multiplexing higher priority and lower priority UCI on a PUCCH in accordance with aspects of the present disclosure. The resource mapping scheme 300-*b* may be implemented by aspects of the wireless communications systems 100 and 200 or may implement aspects of the wireless communications systems 100 and 200 as described with reference to FIGS. 1 and 2, respectively. For example, the resource mapping scheme 300-*b* may be implemented by a UE 115, as described with reference to FIGS. 1 and 2. The resource mapping scheme 300-*b* may be implemented by the UE 115 to map PUCCH resources to improve efficiency and resource usage for uplink transmissions carrying UCI and promote higher reliability for the uplink transmissions carrying the UCI, among other benefits.

In the example of FIG. 3B, the resource mapping scheme 300-*b* may correspond to time resources (e.g., a symbol duration, a minislot duration, a slot duration, a subframe duration, a frame duration), as well as frequency resources (e.g., subcarriers, carriers) for a physical uplink channel, such as a PUCCH. A UE 115 may transmit control information, data, among other information (e.g., reference signals, such as DMRS) using one or more time resources and frequency resources. With reference to FIG. 3B, the time resources may include symbols periods 350, 355, 360, 365, 370, 375, 380, and 385 (e.g., OFDM symbols) in a time domain, and the frequency resources may include a resource block 390 in a frequency domain. In the example of FIG. 3B, the resource mapping scheme 300-*b* does not include any frequency hops.

The UE 115 may map an encoded higher priority UCI and an encoded lower priority UCI to one or more resources according to the resource mapping scheme 300-*b*. In some examples, the UE 115 may map the encoded higher priority UCI and the encoded lower priority UCI based on a rule. For example, the rule may instruct the UE 115 that when mapping the encoded higher priority UCI and the encoded lower priority UCI to physical uplink channel (e.g., a PUCCH) resources, the UE 115 may map the encoded higher priority UCI closer to the DMRS than the encoded lower priority UCI. In the example of FIG. 3B, the symbols periods 360 and 375 may each carry a DMRS, and the UE 115 may thereby map the encoded higher priority UCI on symbol periods 365 and 380 (e.g., relatively closest to the DMRSs), and map the encoded lower priority UCI on one or more remaining available resources (e.g., symbol periods 370 or 385).

In the example of FIG. 3B, the symbol period 355, the symbol period 365, the symbol period 370, and the symbol period 380 may all have the same distance from the DMRS symbols (e.g., the symbol period 360 or the symbol period 375, or both, carrying the DMRS). That is, the symbol period 355, the symbol period 365, the symbol period 370, and the symbol period 380 are all equally close to the DMRS symbols (distance 1). The symbol period 350 and the symbol period 385 may have a distance 2 from the DMRS symbol periods, and are further from the DMRS symbol period than the symbol period 355, the symbol period 365, the symbol period 370, and the symbol period 380. The distance may be measured by means of a minimum distance from any DMRS symbol period in the transmission. In some examples, the distance between the symbol period 390 (e.g., a data symbol period) and the closest symbol period carrying a DMRS may be 3 (e.g., 3 OFDM symbols). Thus, for example, the symbol period 390 is furthest from a DMRS compared to other symbol periods, and may be the last to be considered by the UE 115 when mapping the encoded higher priority UCI (e.g., the symbol 390 may be the least preferred when mapping the encoded high priority UCI). Therefore, the UE 115 may first map the high priority UCI to the symbol period 355, the symbol period 365, the symbol period 370, and the symbol period 380. Additionally or alternatively, if the above mapping is not sufficient, the UE 115 may also map the encoded high priority UCI to the symbol period 350 and the symbol period 385. Additionally, if the above mapping is not sufficient, the UE 115 may also map the encoded high priority UCI to the symbol period 390. The low priority UCI may be mapped by the UE 115 to the remaining resources (e.g., symbol periods) in the PUCCH.

The symbol period 360 carrying DMRS, the symbol period 365 carrying the encoded higher priority UCI, the symbol period 375 carrying DMRS, and the symbol period 380 carrying the encoded higher priority UCI may be contiguous in a time domain or a frequency domain, or both. Alternatively, the symbol period 360 carrying DMRS, the symbol period 365 carrying the encoded higher priority UCI, the symbol period 375 carrying DMRS, and the symbol period 380 carrying the encoded higher priority UCI may be noncontiguous in a time domain or a frequency domain, or both. The symbol period 365 carrying the encoded higher priority UCI, the symbol period 370 carrying the encoded lower priority UCI, the symbol period 380 carrying the encoded higher priority UCI, and the symbol period 385 carrying the encoded lower priority UCI may be contiguous in a time domain or a frequency domain, or both. Alternatively, the symbol period 365 carrying the encoded higher priority UCI, the symbol period 370 carrying the encoded lower priority UCI, the symbol period 380 carrying the encoded higher priority UCI, and the symbol period 385 carrying the encoded lower priority UCI may be noncontiguous in a time domain or a frequency domain, or both. In the example of FIG. 3B, the symbol period 370 carrying the encoded lower priority UCI and the symbol period 375 carrying the DMRS (e.g., a second DMRS) may be contiguous in a time domain or a frequency domain, or both.

Figure 4:
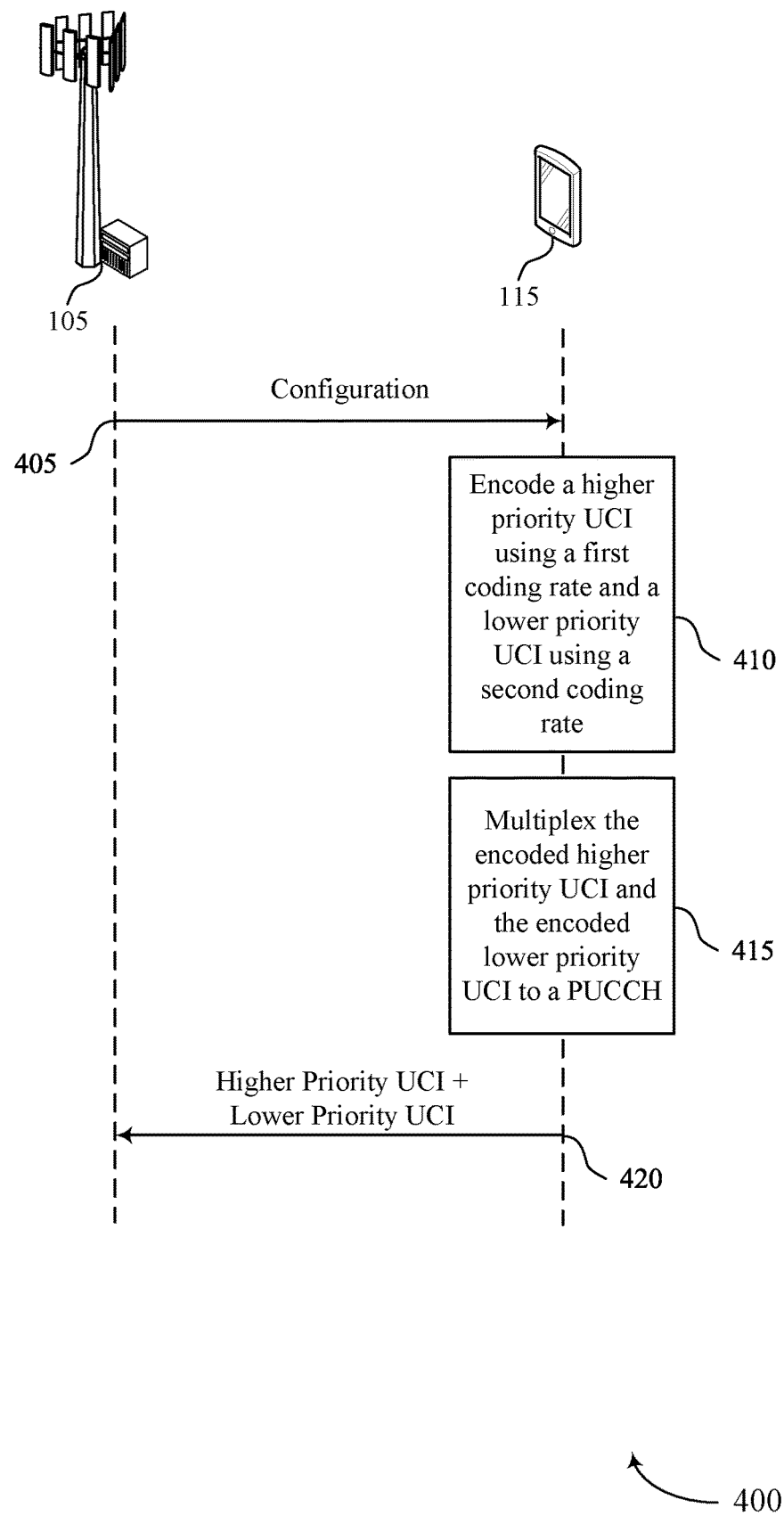
FIG. 4 illustrates an example of a process flow that supports multiplexing higher priority and lower priority UCI on a PUCCH in accordance with aspects of the present disclosure.

FIG. 4 illustrates an example of a process flow 400 that supports multiplexing higher priority and lower priority UCI on a PUCCH in accordance with aspects of the present disclosure. The process flow 400 may implement be implemented by aspects of the wireless communications systems 100 and 200 or may aspects of the wireless communications system 100 and 200 described with reference to FIGS. 1 and 2, respectively. For example, the process flow 400 may be based on a configuration by a base station 105 or a UE 115, and implemented by the UE 115. The base station 105 and the UE 115 may be examples of a base station and a UE, as described with reference to FIGS. 1 and 2. In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400.

At 405, the base station 105 may transmit, to the UE 115, a configuration including a set of coding rates for encoding UCI (e.g., one or more UCI bits). Each coding rate of the set of coding rates may be associated with a first priority (e.g., a higher priority), or a second priority (e.g., a lower priority), or a combination thereof. In an example, the base station 105 may transmit an RRC message, a MAC-CE message, or a downlink control information (DCI) message (or any combination thereof) indicating the configuration. At 410, the UE 115 may encode a higher priority UCI using a first coding rate and a lower priority UCI using a second coding rate. In some examples, the set of coding rates may include a first subset of coding rates for the first priority (e.g., a higher priority) and a second subset of coding rates for the second priority (e.g., a lower priority), as described with reference to FIG. 2. In some examples, the first subset of coding rates may be different than the second subset of coding rates.

At 415, the UE 115 may multiplex the encoded higher priority UCI and the encoded lower priority UCI to a PUCCH. For example, the UE 115 may multiplex the encoded higher priority UCI and the encoded lower priority UCI to the PUCCH by mapping the encoded higher priority UCI and the encoded lower priority UCI to a set of PUCCH resources as described with reference to FIGS. 2, 3A, and 3B. The PUCCH may correspond to one or more PUCCH resources configured with multiple coding rates. In some examples, the PUCCH may correspond to a PUCCH format, which may include a PUCCH format 2, a PUCCH format 3, or a PUCCH format 4. In some examples, as described with reference to FIGS. 2, 3A, and 3B, the one or more PUCCH resources associated with the mapped encoded higher priority UCI and the encoded lower priority UCI may be contiguous in a time domain or noncontiguous in the time domain. Additionally or alternatively, as described with reference to FIGS. 2, 3A, and 3B, the one or more PUCCH resources associated with the mapped encoded higher priority UCI and the encoded lower priority UCI may be contiguous in a frequency domain or noncontiguous in the frequency domain. At 420, the UE 115 may transmit, to the base station 105, the encoded higher priority UCI and the encoded lower priority UCI via the PUCCH.

Figure 5:
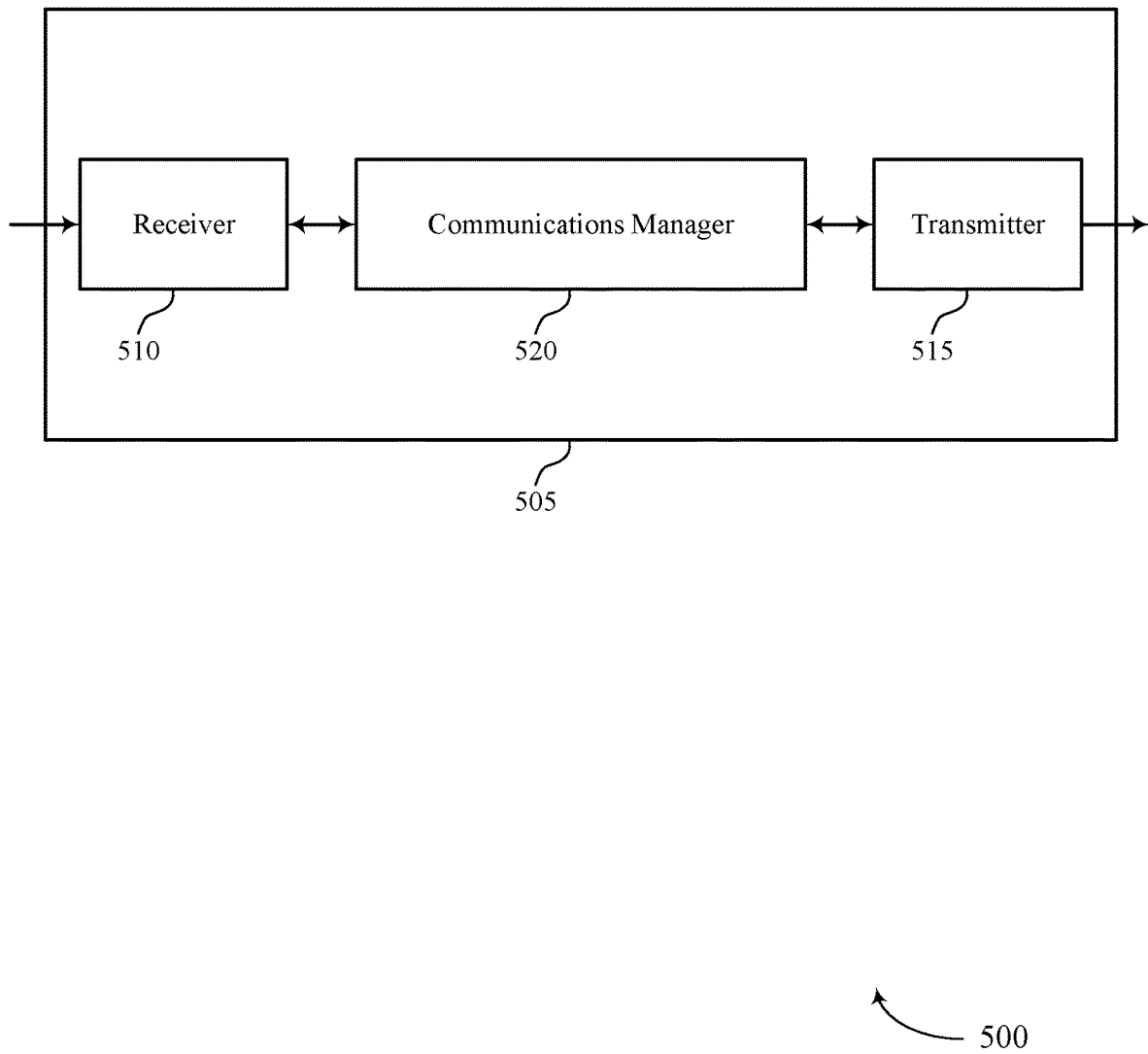
FIGS. 5 and 6 show block diagrams of devices that support multiplexing higher priority and lower priority UCI on a PUCCH in accordance with aspects of the present disclosure.

FIG. 5 shows a block diagram 500 of a device 505 that supports multiplexing higher priority and lower priority UCI on a PUCCH in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiplexing higher priority and lower priority UCI on a PUCCH). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiplexing higher priority and lower priority UCI on a PUCCH). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of multiplexing higher priority and lower priority UCI on a PUCCH as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in accordance with examples as disclosed herein. For example, the communications manager 520 may be configured as or otherwise support a means for encoding, basing at least in part on a configuration, a first set of UCI bits using a first coding rate and a second set of UCI bits using a second coding rate, the first set of UCI bits associated with a first priority and the second set of UCI bits associated with a second priority. The communications manager 520 may be configured as or otherwise support a means for multiplexing the encoded first set of UCI bits and the encoded second set of UCI bits to a PUCCH by mapping the encoded first set of UCI bits and the encoded second set of UCI bits to a set of resources. The communications manager 520 may be configured as or otherwise support a means for transmitting the encoded first set of UCI bits and the encoded second set of UCI bits based on the multiplexing.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved UCI transmissions. By configuring the device 505 to separately encode lower priority UCI and higher priority UCI, the device 505 may avoid retransmissions of some UCI because the lower priority UCI and higher priority UCI are separately protected.

In some examples, configuring the device 505 to support multiplexing the separately encoded lower priority UCI and higher priority UCI may support improvements to power saving for the device 505. For example, the device 505 may increase its battery life by providing efficient uplink transmissions of UCI.

Figure 6:
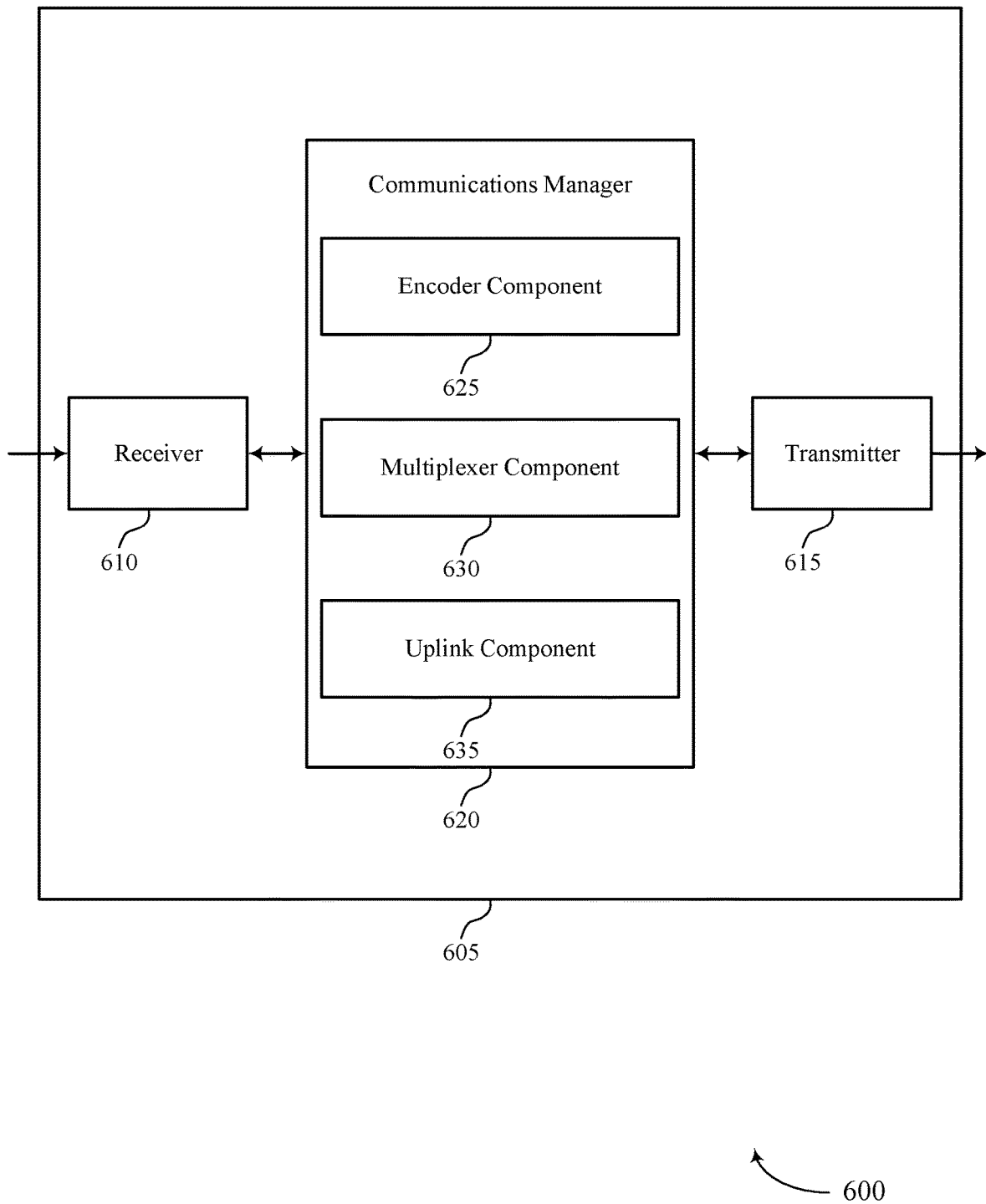

FIG. 6 shows a block diagram 600 of a device 605 that supports multiplexing higher priority and lower priority UCI on a PUCCH in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiplexing higher priority and lower priority UCI on a PUCCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiplexing higher priority and lower priority UCI on a PUCCH). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of multiplexing higher priority and lower priority UCI on a PUCCH as described herein. For example, the communications manager 620 may include an encoder component 625, a multiplexer component 630, an uplink component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The encoder component 625 may be configured as or otherwise support a means for encoding, based on a configuration, a first set of UCI bits using a first coding rate and a second set of UCI bits using a second coding rate, the first set of UCI bits associated with a first priority and the second set of UCI bits associated with a second priority. The multiplexer component 630 may be configured as or otherwise support a means for multiplexing the encoded first set of UCI bits and the encoded second set of UCI bits to a PUCCH by mapping the encoded first set of UCI bits and the encoded second set of UCI bits to a set of resources. The uplink component 635 may be configured as or otherwise support a means for transmitting the encoded first set of UCI bits and the encoded second set of UCI bits based on the multiplexing.

Figure 7:
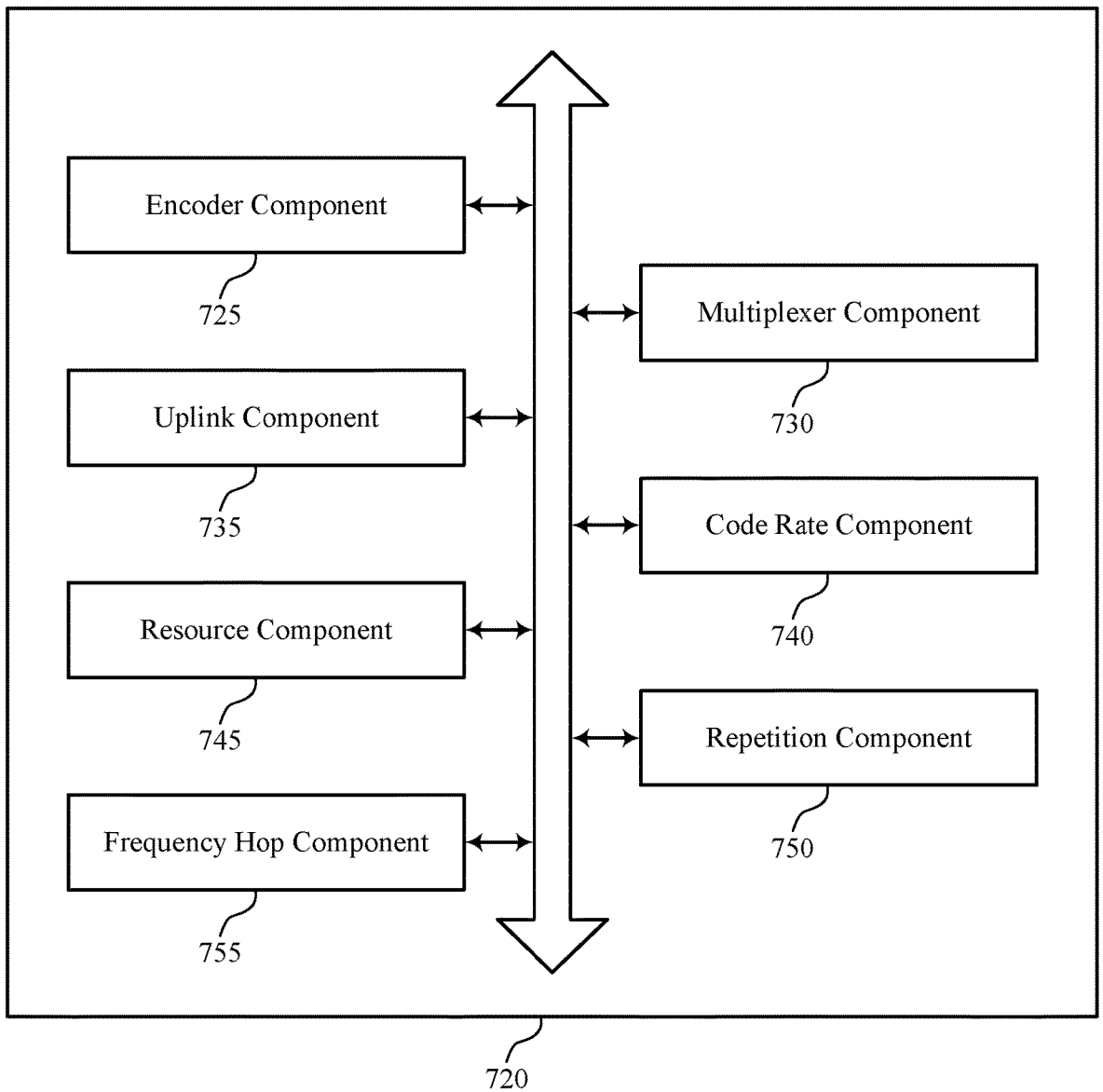
FIG. 7 shows a block diagram of a communications manager that supports multiplexing higher priority and lower priority UCI on a PUCCH in accordance with aspects of the present disclosure.

FIG. 7 shows a block diagram 700 of a communications manager 720 that supports multiplexing higher priority and lower priority UCI on a PUCCH in accordance with aspects of the present disclosure. The communications manager 720 may be an example of aspects of a communications manager 520, a communications manager 620, or both, as described herein. The communications manager 720, or various components thereof, may be an example of means for performing various aspects of multiplexing higher priority and lower priority UCI on a PUCCH as described herein. For example, the communications manager 720 may include an encoder component 725, a multiplexer component 730, an uplink component 735, a code rate component 740, a resource component 745, a repetition component 750, a frequency hop component 755, or any combination thereof. Each of these components may communicate, directly or indirectly, with one another (e.g., via one or more buses).

The communications manager 720 may support wireless communication at a UE in accordance with examples as disclosed herein. The encoder component 725 may be configured as or otherwise support a means for encoding, based on a configuration, a first set of UCI bits using a first coding rate and a second set of UCI bits using a second coding rate, the first set of UCI bits associated with a first priority and the second set of UCI bits associated with a second priority. The multiplexer component 730 may be configured as or otherwise support a means for multiplexing the encoded first set of UCI bits and the encoded second set of UCI bits to a PUCCH by mapping the encoded first set of UCI bits and the encoded second set of UCI bits to a set of resources. The uplink component 735 may be configured as or otherwise support a means for transmitting the encoded first set of UCI bits and the encoded second set of UCI bits based on the multiplexing.

In some examples, the code rate component 740 may be configured as or otherwise support a means for receiving a message carrying the configuration, where the configuration includes a set of coding rates for the PUCCH, each coding rate of the set of coding rates associated with the first priority or the second priority, or a combination thereof. In some examples, the code rate component 740 may be configured as or otherwise support a means for selecting, from the set of coding rates, the first coding rate for the first set of UCI bits and the second coding rate for the second set of UCI bits. In some examples, the encoder component 725 may be configured as or otherwise support a means for where encoding the first set of UCI bits and the second set of UCI bits is based on the selected first coding rate and the selected second coding rate. In some examples, the set of coding rates includes a first subset of coding rates for the first priority and a second subset of coding rates for the second priority. In some examples, the first subset of coding rates is different than the second subset of coding rates.

The code rate component 740 may be configured as or otherwise support a means for selecting, from the set of coding rates, the first coding rate for the first set of UCI bits, or the second coding rate for the second set of UCI bits, or a combination thereof, based on determining that a payload size of each of the first set of UCI bits and the second set of UCI bits satisfies a threshold payload size, the threshold payload size being less than or equal to 2 bits. In some examples, the code rate component 740 may be configured as or otherwise support a means for where the first set of UCI bits and the second set of UCI bits include HARQ-ACK bits or SR bits, or a combination thereof.

In some examples, the code rate component 740 may be configured as or otherwise support a means for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being between 2 bits and 11 bits. In some examples, the code rate component 740 may be configured as or otherwise support a means for where the first set of UCI bits and the second set of UCI bits include HARQ-ACK bits, SR bits, or CSI bits associated with a CSI part 1, or a combination thereof.

The code rate component 740 may be configured as or otherwise support a means for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being greater than 11 bits. In some examples, the code rate component 740 may be configured as or otherwise support a means for where the first set of UCI bits and the second set of UCI bits include CSI bits associated with a CSI part 2.

In some examples, the code rate component 740 may be configured as or otherwise support a means for selecting, from the set of coding rates, the first coding rate for the first set of UCI bits or the second coding rate for the second set of UCI bits, or a combination thereof, based on determining that a first payload size of the first set of UCI bits satisfies a first threshold payload size being greater than 11 bits, and second payload size of the second set of UCI bits satisfies a second threshold payload size, the second threshold payload size being greater than 2 bits and less than or equal to 11 bits. In some examples, the code rate component 740 may be configured as or otherwise support a means for where the first set of UCI bits includes HARQ-ACK bits, SR bits, or CSI bits associated with a CSI part 1, or a combination thereof, and the second set of UCI bits include CSI bits associated with a CSI part 2.

In some examples, the code rate component 740 may be configured as or otherwise support a means for selecting, from the set of coding rates, the first coding rate for the first set of UCI bits or the second coding rate for the second set of UCI bits, or a combination thereof, based on determining that a payload size of each of the first set of UCI bits and the second set of UCI bits satisfies a threshold payload size, the threshold payload size being less than or equal to 2 bits or being greater than 2 bits. In some examples, the message includes an RRC message, a MAC-CE message, or a DCI message, or a combination thereof. In some examples, the PUCCH corresponds to a PUCCH resource configured with multiple coding rates. In some examples, the PUCCH corresponds to a PUCCH format including a PUCCH format 2, a PUCCH format 3, or a PUCCH format 4.

The resource component 745 may be configured as or otherwise support a means for determining a total number of uplink resources for the first set of UCI bits and the second set of UCI bits. In some examples, the resource component 745 may be configured as or otherwise support a means for determining a number of resource blocks based on the total number of uplink resources for the first set of UCI bits and the second set of UCI bits. In some examples, the multiplexer component 730 may be configured as or otherwise support a means for where multiplexing the encoded first set of UCI bits and the encoded second set of UCI bits to the PUCCH is based on the number of resource blocks. In some examples, the encoder component 725 may be configured as or otherwise support a means for encoding an UCI bit of the first set of UCI bits using a repetition code based on the first coding rate. In some examples, the uplink component 735 may be configured as or otherwise support a means for transmitting the UCI bit, the UCI bit including a HARQ-ACK bit or a SR bit.

In some examples, the multiplexer component 730 may be configured as or otherwise support a means for multiplexing two UCI bits of the first set of UCI bits associated with the first priority with one or more UCI bits of the second set of UCI bits associated with the second priority. In some examples, the encoder component 725 may be configured as or otherwise support a means for encoding the two UCI bits of the first set of UCI bits using a simplex code. In some examples, the repetition component 750 may be configured as or otherwise support a means for repeating the simplex encoded two UCI bits based on the first coding rate. In some examples, the uplink component 735 may be configured as or otherwise support a means for transmitting the two UCI bits of the first set of UCI bits, the two UCI bits including HARQ-ACK bits or SR bits, or a combination thereof.

In some examples, to support encoding the first set of UCI bits and the second set of UCI bits, the encoder component 725 may be configured as or otherwise support a means for separately encoding the first set of UCI bits using the first coding rate and the second set of UCI bits using the second coding rate different than the first coding rate based on an encoding rule identifying an encoding order. In some examples, the first set of UCI bits and the second set of UCI bits includes a set of HARQ-ACK bits, a set of SR bits, a first set of CSI bits associated with a CSI part 1, or a second set of CSI bits associated with a CSI part 2, or a combination thereof.

The encoder component 725 may be configured as or otherwise support a means for separately encoding a first subset of UCI bits of the first set of UCI bits associated with the first priority and a second subset of UCI bits of the second set of UCI bits associated with the second priority based on an encoding rule. In some examples, the encoder component 725 may be configured as or otherwise support a means for where the first subset of UCI bits and the second subset of UCI bits includes HARQ-ACK bits, SR bits, CSI bits associated with a CSI part 1, or a combination thereof. The encoder component 725 may be configured as or otherwise support a means for separately encoding a third subset of UCI bits of the first set of UCI bits associated with the first priority. In some examples, the encoder component 725 may be configured as or otherwise support a means for where the third subset of UCI bits includes CSI bits associated with a CSI part 2.

The resource component 745 may be configured as or otherwise support a means for determining one or more resources of a set of resources associated with the PUCCH for each of the encoded first subset of UCI bits, the encoded second subset of UCI bits, and the encoded third subset of UCI bits. In some examples, the resource component 745 may be configured as or otherwise support a means for mapping the encoded first subset of UCI bits, the encoded second subset of UCI bits, and the encoded third subset of UCI bits, to the set of resources associated with the PUCCH based on a resource mapping rule. In some examples, the encoded first subset of UCI bits, the encoded second subset of UCI bits, and the encoded third subset of UCI bits are mapped in a contiguous order. In some examples, the encoded first subset of UCI bits, the encoded second subset of UCI bits, and the encoded third subset of UCI bits are mapped in a noncontiguous order.

In some examples, the resource component 745 may be configured as or otherwise support a means for determining a first uplink resource of the set of resources associated with a demodulation reference signal. In some examples, the resource component 745 may be configured as or otherwise support a means for mapping the first set of UCI bits to a second uplink resource adjacent to the first uplink resource associated with the demodulation reference signal. In some examples, the first uplink resource and the second uplink resource are contiguous in a time domain, or a frequency domain, or a combination thereof. In some examples, the first uplink resource is nonadjacent to a third uplink resource associated with the second set of UCI bits. In some examples, the first uplink resource and the third uplink resource are noncontiguous in a time domain, or a frequency domain, or a combination thereof.

The frequency hop component 755 may be configured as or otherwise support a means for determining that the PUCCH is scheduled with frequency hopping including at least two frequency hops. In some examples, the frequency hop component 755 may be configured as or otherwise support a means for mapping the encoded first set of UCI bits to both a first frequency hop and a second frequency hop of the at least two frequency hops. In some examples, the frequency hop component 755 may be configured as or otherwise support a means for uniformly mapping the encoded first set of UCI bits to the first frequency hop and the second frequency hop of the at least two frequency hops using the same number of resources or substantially the same number of resources for the first frequency hop and the second frequency hop.

Figure 8:
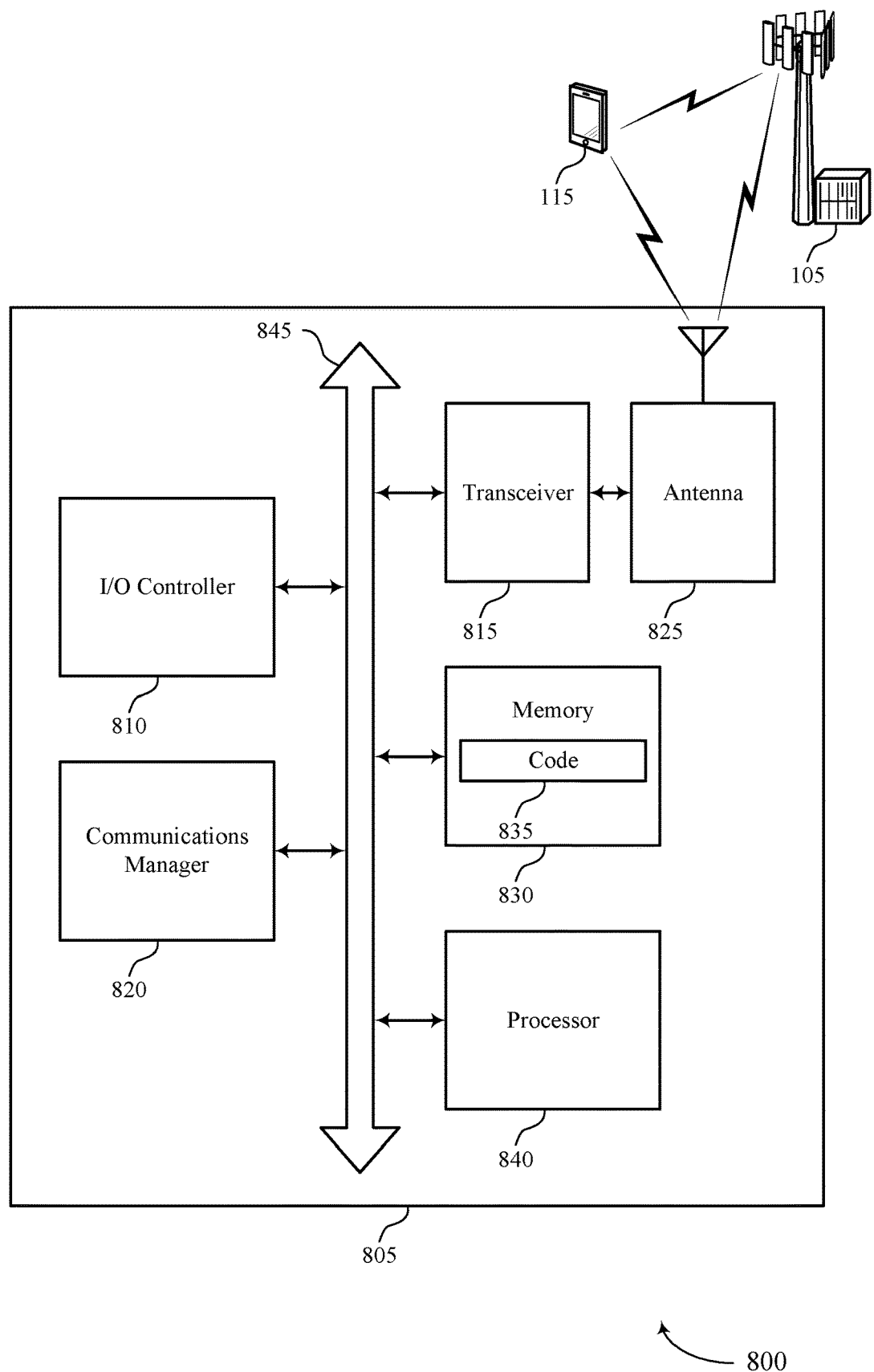
FIG. 8 shows a diagram of a system including a device that supports multiplexing higher priority and lower priority UCI on a PUCCH in accordance with aspects of the present disclosure.

FIG. 8 shows a diagram of a system 800 including a device 805 that supports multiplexing higher priority and lower priority UCI on a PUCCH in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

The device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing higher priority and lower priority UCI on a PUCCH). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for encoding, basing at least in part on a configuration, a first set of UCI bits using a first coding rate and a second set of UCI bits using a second coding rate, the first set of UCI bits associated with a first priority and the second set of UCI bits associated with a second priority. The communications manager 820 may be configured as or otherwise support a means for multiplexing the encoded first set of UCI bits and the encoded second set of UCI bits to a PUCCH by mapping the encoded first set of UCI bits and the encoded second set of UCI bits to a set of resources. The communications manager 820 may be configured as or otherwise support a means for transmitting the encoded first set of UCI bits and the encoded second set of UCI bits based on the multiplexing. By including or configuring the communications manager 820 in accordance with examples as described herein, the device 805 may support techniques for improved UCI transmission reliability, reduced UCI transmission latency, reduced power consumption, more efficient utilization of uplink resources for UCI transmission of higher priority UCI and lower priority UCI, longer battery life, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiplexing higher priority and lower priority UCI on a PUCCH as described herein, or the processor 840 and the memory 830 may be otherwise configured to perform or support such operations.

Figure 9:
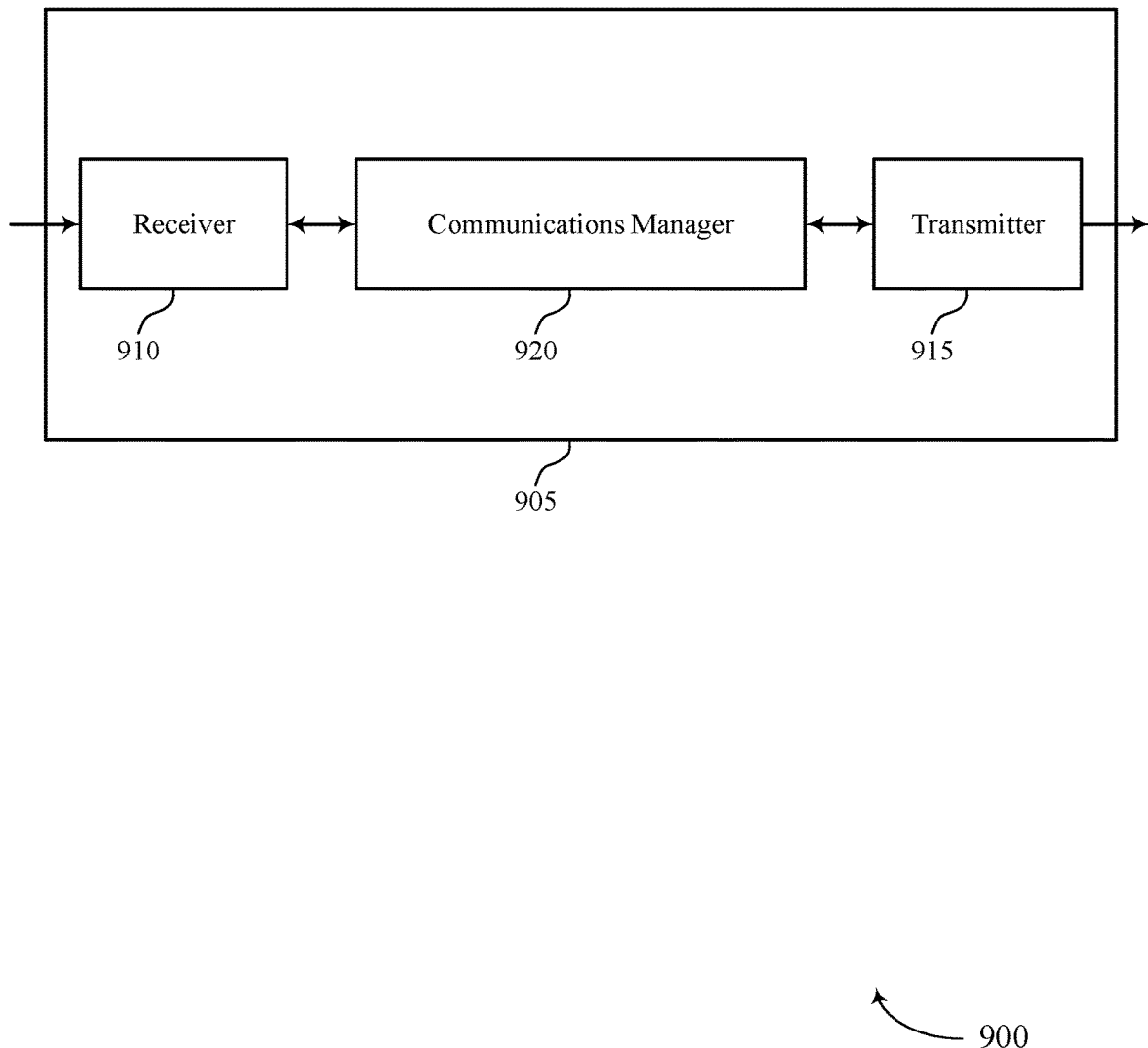
FIGS. 9 and 10 show block diagrams of devices that support multiplexing higher priority and lower priority UCI on a PUCCH in accordance with aspects of the present disclosure.

FIG. 9 shows a block diagram 900 of a device 905 that supports multiplexing higher priority and lower priority UCI on a PUCCH in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing higher priority and lower priority UCI on a PUCCH). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing higher priority and lower priority UCI on a PUCCH). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of multiplexing higher priority and lower priority UCI on a PUCCH as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a configuration including a set of coding rates for encoding UCI bits, each coding rate of the set of coding rates associated with a first priority, or a second priority, or a combination thereof. The communications manager 920 may be configured as or otherwise support a means for receiving, from the UE via a PUCCH, an encoded first set of UCI bits associated with the first priority and an encoded second set of UCI bits associated with the second priority. The communications manager 920 may be configured as or otherwise support a means for decoding the encoded first set of UCI bits using a first coding rate and the encoded second set of UCI bits using a second coding rate based on the configuration. By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced UCI processing.

Figure 10:
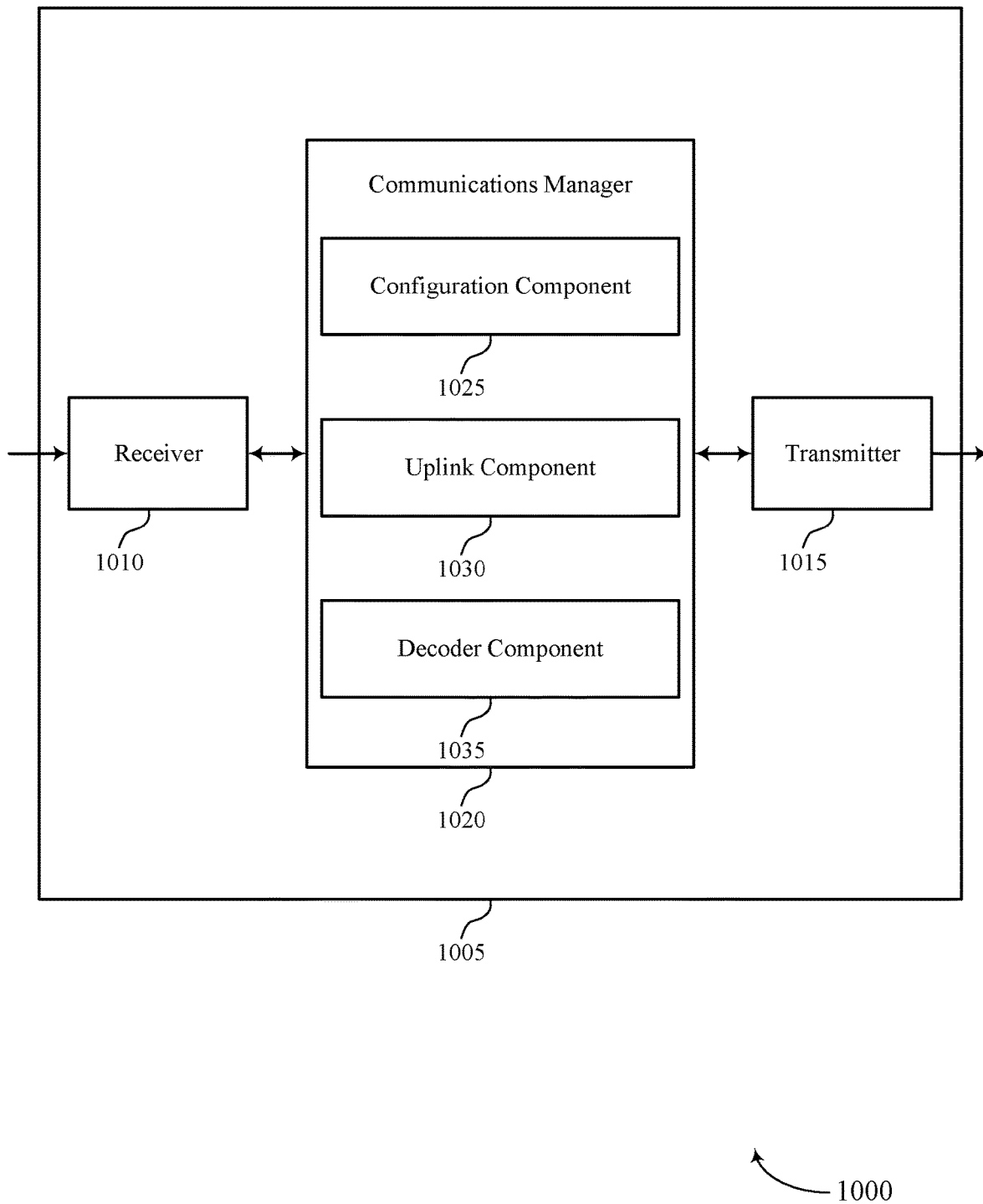

FIG. 10 shows a block diagram 1000 of a device 1005 that supports multiplexing higher priority and lower priority UCI on a PUCCH in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiplexing higher priority and lower priority UCI on a PUCCH). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiplexing higher priority and lower priority UCI on a PUCCH). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of multiplexing higher priority and lower priority UCI on a PUCCH as described herein. For example, the communications manager 1020 may include a configuration component 1025, an uplink component 1030, a decoder component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration component 1025 may be configured as or otherwise support a means for transmitting, to a UE, a configuration including a set of coding rates for encoding UCI bits, each coding rate of the set of coding rates associated with a first priority, or a second priority, or a combination thereof. The uplink component 1030 may be configured as or otherwise support a means for receiving, from the UE via a PUCCH, an encoded first set of UCI bits associated with the first priority and an encoded second set of UCI bits associated with the second priority. The decoder component 1035 may be configured as or otherwise support a means for decoding the encoded first set of UCI bits using a first coding rate and the encoded second set of UCI bits using a second coding rate based on the configuration.

Figure 11:
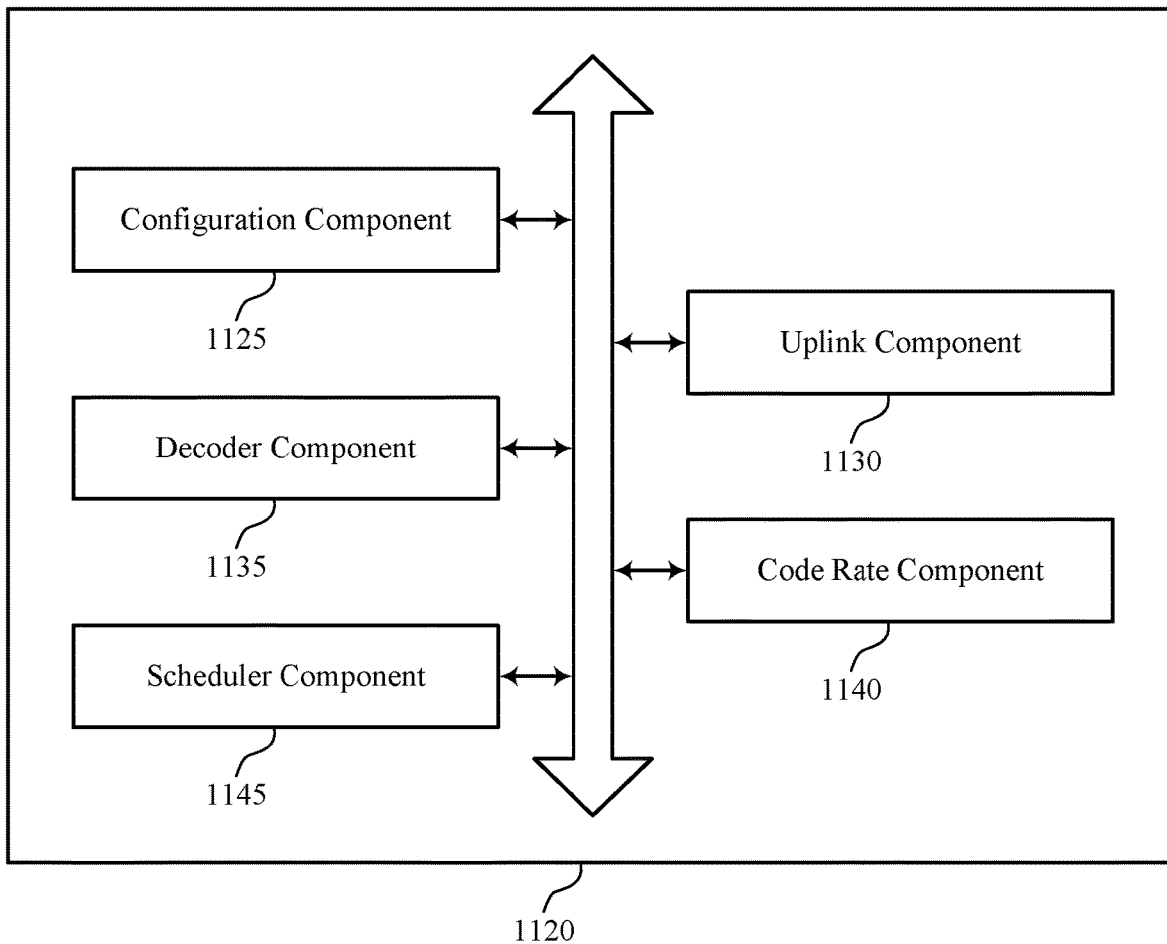
FIG. 11 shows a block diagram of a communications manager that supports multiplexing higher priority and lower priority UCI on a PUCCH in accordance with aspects of the present disclosure.

FIG. 11 shows a block diagram 1100 of a communications manager 1120 that supports multiplexing higher priority and lower priority UCI on a PUCCH in accordance with aspects of the present disclosure. The communications manager 1120 may be an example of aspects of a communications manager 920, a communications manager 1020, or both, as described herein. The communications manager 1120, or various components thereof, may be an example of means for performing various aspects of multiplexing higher priority and lower priority UCI on a PUCCH as described herein. For example, the communications manager 1120 may include a configuration component 1125, an uplink component 1130, a decoder component 1135, a code rate component 1140, a scheduler component 1145, or any combination thereof. Each of these components may communicate, directly or indirectly, with one another (e.g., via one or more buses).

The communications manager 1120 may support wireless communication at a base station in accordance with examples as disclosed herein. The configuration component 1125 may be configured as or otherwise support a means for transmitting, to a UE, a configuration including a set of coding rates for encoding UCI bits, each coding rate of the set of coding rates associated with a first priority, or a second priority, or a combination thereof. The uplink component 1130 may be configured as or otherwise support a means for receiving, from the UE via a PUCCH, an encoded first set of UCI bits associated with the first priority and an encoded second set of UCI bits associated with the second priority. The decoder component 1135 may be configured as or otherwise support a means for decoding the encoded first set of UCI bits using a first coding rate and the encoded second set of UCI bits using a second coding rate based on the configuration. In some examples, the set of coding rates includes a first subset of coding rates for the first priority and a second subset of coding rates for the second priority. In some examples, the first subset of coding rates is different than the second subset of coding rates.

The code rate component 1140 may be configured as or otherwise support a means for selecting, from the set of coding rates, the first coding rate for the encoded first set of UCI bits or the second coding rate for the encoded second set of UCI bits, or a combination thereof, based on determining that a payload size of each of the encoded first set of UCI bits and the encoded second set of UCI bits satisfies a threshold payload size, the threshold payload size being less than or equal to 2 bits. In some examples, the code rate component 1140 may be configured as or otherwise support a means for where the encoded first set of UCI bits and the encoded second set of UCI bits include HARQ-ACK bits or SR bits, or a combination thereof.

In some examples, the code rate component 1140 may be configured as or otherwise support a means for selecting, from the set of coding rates, the first coding rate for the encoded first set of UCI bits or the second coding rate for the encoded second set of UCI bits, or a combination thereof, based on determining that a payload size of each of the encoded first set of UCI bits and the encoded second set of UCI bits satisfies a threshold payload size, the threshold payload size being between 2 bits and 11 bits. In some examples, the code rate component 1140 may be configured as or otherwise support a means for where the encoded first set of UCI bits and the encoded second set of UCI bits include HARQ-ACK bits, SR bits, or CSI bits associated with a CSI part 1, or a combination thereof.

The code rate component 1140 may be configured as or otherwise support a means for selecting, from the set of coding rates, the first coding rate for the encoded first set of UCI bits or the second coding rate for the encoded second set of UCI bits, or a combination thereof, based on determining that a payload size of each of the encoded first set of UCI bits and the encoded second set of UCI bits satisfies a threshold payload size, the threshold payload size being greater than 11 bits. In some examples, the code rate component 1140 may be configured as or otherwise support a means for where the encoded first set of UCI bits and the encoded second set of UCI bits include CSI bits associated with a CSI part 2.

In some examples, the code rate component 1140 may be configured as or otherwise support a means for selecting, from the set of coding rates, the first coding rate for the encoded first set of UCI bits or the second coding rate for the encoded second set of UCI bits, or a combination thereof, based on determining that a first payload size of the encoded first set of UCI bits satisfies a first threshold payload size being greater than 11 bits, and second payload size of the encoded second set of UCI bits satisfies a second threshold payload size, the second threshold payload size being greater than 2 bits and less than or equal to 11 bits. In some examples, the code rate component 1140 may be configured as or otherwise support a means for where the encoded first set of UCI bits includes HARQ-ACK bits, SR bits, or CSI bits associated with a CSI part 1, or a combination thereof, and the encoded second set of UCI bits include CSI bits associated with a CSI part 2.

The code rate component 1140 may be configured as or otherwise support a means for selecting, from the set of coding rates, the first coding rate for the encoded first set of UCI bits or the second coding rate for the encoded second set of UCI bits, or a combination thereof, based on determining that a payload size of each of the encoded first set of UCI bits and the encoded second set of UCI bits satisfies a threshold payload size, where the threshold payload size being less than or equal to 2 bits or being greater than 2 bits. In some examples, the message includes an RRC message, a MAC-CE message, or a DCI message, or a combination thereof. In some examples, the PUCCH corresponds to a PUCCH resource configured with multiple coding rates. In some examples, the PUCCH corresponds to a PUCCH format including a PUCCH format 2, a PUCCH format 3, or a PUCCH format 4.

The uplink component 1130 may be configured as or otherwise support a means for receiving an UCI bit of the encoded first set of UCI bits, the UCI bit of the encoded first set of UCI bits including a HARQ-ACK bit or a SR bit. In some examples, the uplink component 1130 may be configured as or otherwise support a means for receiving two UCI bits of the encoded first set of UCI bits, the two UCI bits of the encoded first set of UCI bits including HARQ-ACK bits or SR bits, or a combination thereof, where the two UCI bits are encoded using a simplex code. In some examples, the first set of UCI bits are separately decoded using the first coding rate and the second set of UCI bits are separately decoded using the second coding rate. In some examples, the first set of UCI bits and the second set of UCI bits includes a set of HARQ-ACK bits, a set of SR bits, a first set of CSI bits associated with a CSI part 1, or a second set of CSI bits associated with a CSI part 2, or a combination thereof.

In some examples, the decoder component 1135 may be configured as or otherwise support a means for separately decoding a first subset of UCI bits of the encoded first set of UCI bits associated with the first priority and a second subset of UCI bits of the encoded second set of UCI bits associated with the second priority based on a decoding rule. In some examples, the decoder component 1135 may be configured as or otherwise support a means for where the first subset of UCI bits and the second subset of UCI bits includes HARQ-ACK bits, SR bits, CSI bits associated with a CSI part 1, or a combination thereof. In some examples, the decoder component 1135 may be configured as or otherwise support a means for separately decoding a third subset of UCI bits of the encoded first set of UCI bits associated with the first priority. In some examples, the decoder component 1135 may be configured as or otherwise support a means for where the third subset of UCI bits includes CSI bits associated with a CSI part 2.

In some examples, the encoded first subset of UCI bits, the encoded second subset of UCI bits, and the encoded third subset of UCI bits, are demapped from the set of resources in a contiguous order. In some examples, the encoded first subset of UCI bits, the encoded second subset of UCI bits, and the encoded third subset of UCI bits are demapped from the set of resources in a noncontiguous order. In some examples, a first uplink resource of the set of uplink resources is adjacent to a second uplink resource of the set of uplink resources, the first uplink resources associated with a demodulation reference signal and the second uplink resource associated with the encoded first set of UCI. In some examples, the first uplink resource and the third uplink resource are contiguous or noncontiguous in a time domain or a frequency domain, or a combination thereof. In some examples, a first uplink resource of the set of uplink resources is nonadjacent to a second uplink resource of the set of uplink resources, the first uplink resources associated with a demodulation reference signal and the second uplink resource associated with the encoded second set of UCI. In some examples, the first uplink resource and the third uplink resource are noncontiguous in a time domain, or a frequency domain, or a combination thereof.

The scheduler component 1145 may be configured as or otherwise support a means for scheduling the PUCCH with frequency hopping including at least two frequency hops, where the encoded first set of UCI bits are mapped to a first frequency hop and a second frequency hop of the at least two frequency hops. In some examples, the encoded first set of UCI bits are uniformly mapped to both the frequency hops of the at least two frequency hops using the same number of resources or substantially the same number of resources for the first frequency hop and the second frequency hop.

Figure 12:
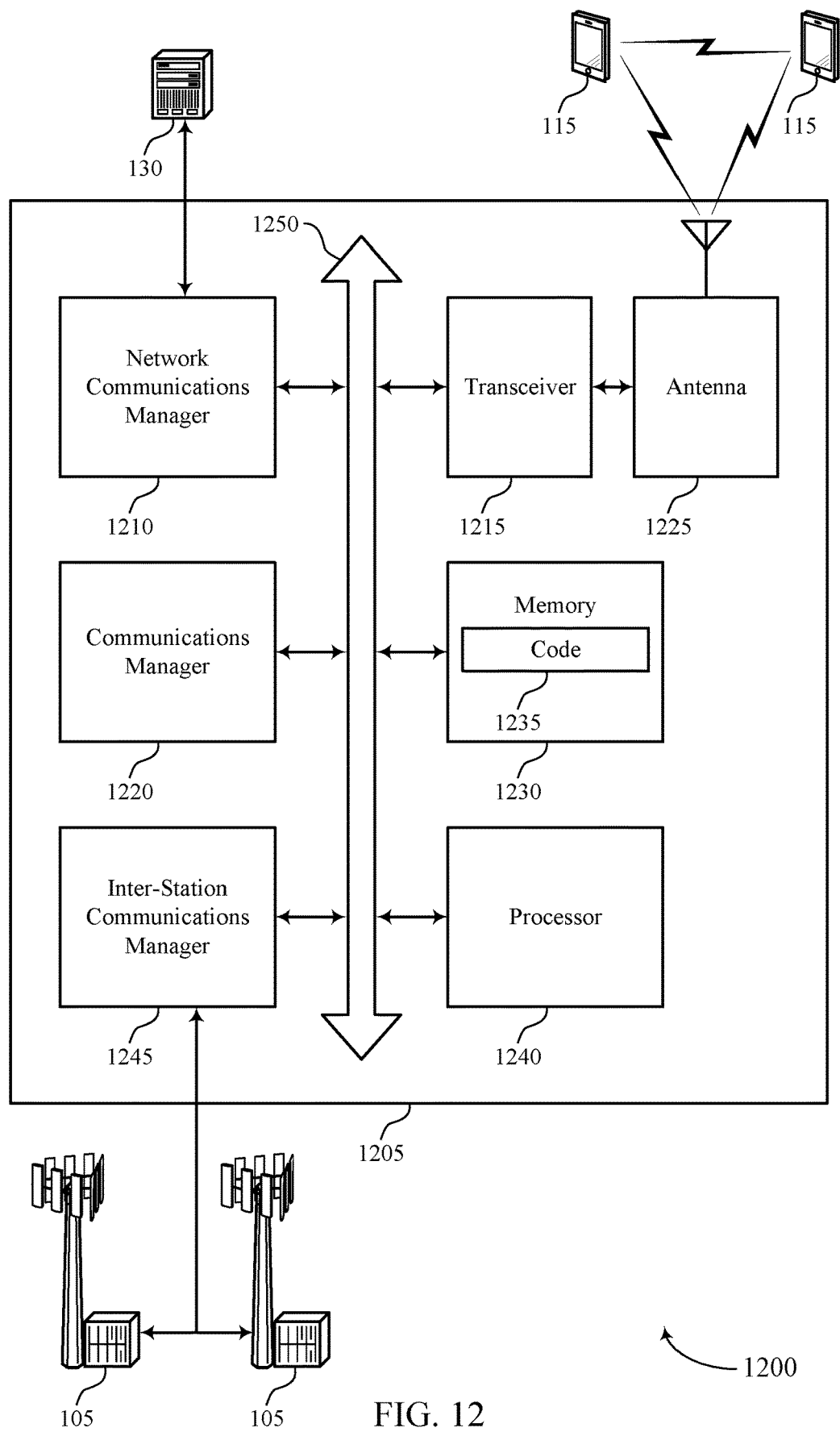
FIG. 12 shows a diagram of a system including a device that supports multiplexing higher priority and lower priority UCI on a PUCCH in accordance with aspects of the present disclosure.

FIG. 12 shows a diagram of a system 1200 including a device 1205 that supports multiplexing higher priority and lower priority UCI on a PUCCH in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115. The device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiplexing higher priority and lower priority UCI on a PUCCH). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a configuration including a set of coding rates for encoding UCI bits, each coding rate of the set of coding rates associated with a first priority, or a second priority, or a combination thereof. The communications manager 1220 may be configured as or otherwise support a means for receiving, from the UE via a PUCCH, an encoded first set of UCI bits associated with the first priority and an encoded second set of UCI bits associated with the second priority. The communications manager 1220 may be configured as or otherwise support a means for decoding the encoded first set of UCI bits using a first coding rate and the encoded second set of UCI bits using a second coding rate based on the configuration. By including or configuring the communications manager 1220 in accordance with examples as described herein, the device 1205 may support techniques for improved UCI reception reliability, reduced UCI reception latency, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multiplexing higher priority and lower priority UCI on a PUCCH as described herein, or the processor 1240 and the memory 1230 may be otherwise configured to perform or support such operations.

Figure 13:
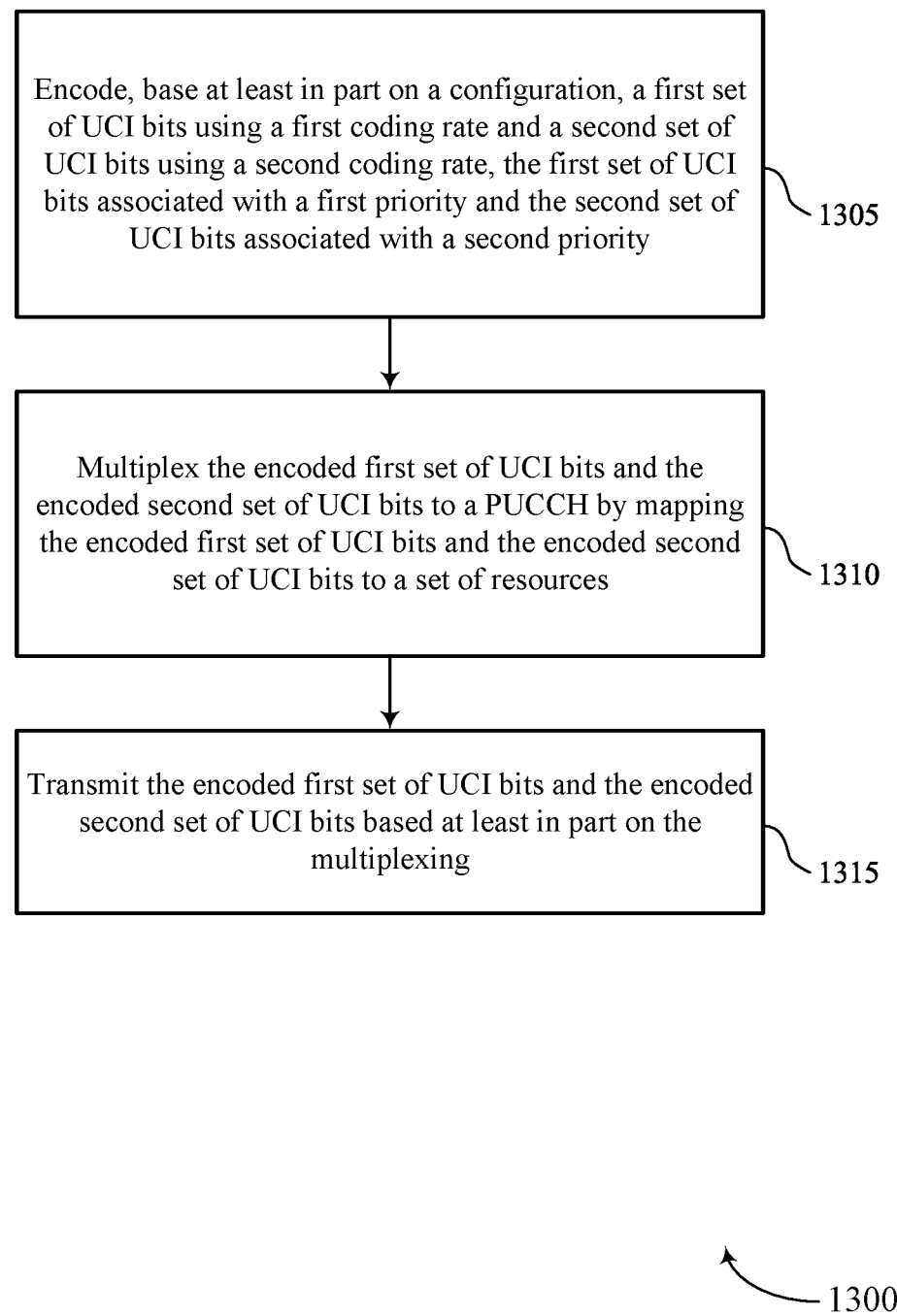
FIGS. 13 through 15 show flowcharts illustrating methods that support multiplexing higher priority and lower priority UCI on a PUCCH in accordance with aspects of the present disclosure.

FIG. 13 shows a flowchart illustrating a method 1300 that supports multiplexing higher priority and lower priority UCI on a PUCCH in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include encoding, based on a configuration, a first set of UCI bits using a first coding rate and a second set of UCI bits using a second coding rate, the first set of UCI bits associated with a first priority and the second set of UCI bits associated with a second priority. The operations of 1305 may be performed in accordance with examples as disclosed herein. In some examples, aspects of the operations of 1305 may be performed by an encoder component 725 as described with reference to FIG. 7.

At 1310, the method may include multiplexing the encoded first set of UCI bits and the encoded second set of UCI bits to a PUCCH by mapping the encoded first set of UCI bits and the encoded second set of UCI bits to a set of resources. The operations of 1310 may be performed in accordance with examples as disclosed herein. In some examples, aspects of the operations of 1310 may be performed by a multiplexer component 730 as described with reference to FIG. 7.

At 1315, the method may include transmitting the encoded first set of UCI bits and the encoded second set of UCI bits based on the multiplexing. The operations of 1315 may be performed in accordance with examples as disclosed herein. In some examples, aspects of the operations of 1315 may be performed by an uplink component 735 as described with reference to FIG. 7.

Figure 14:
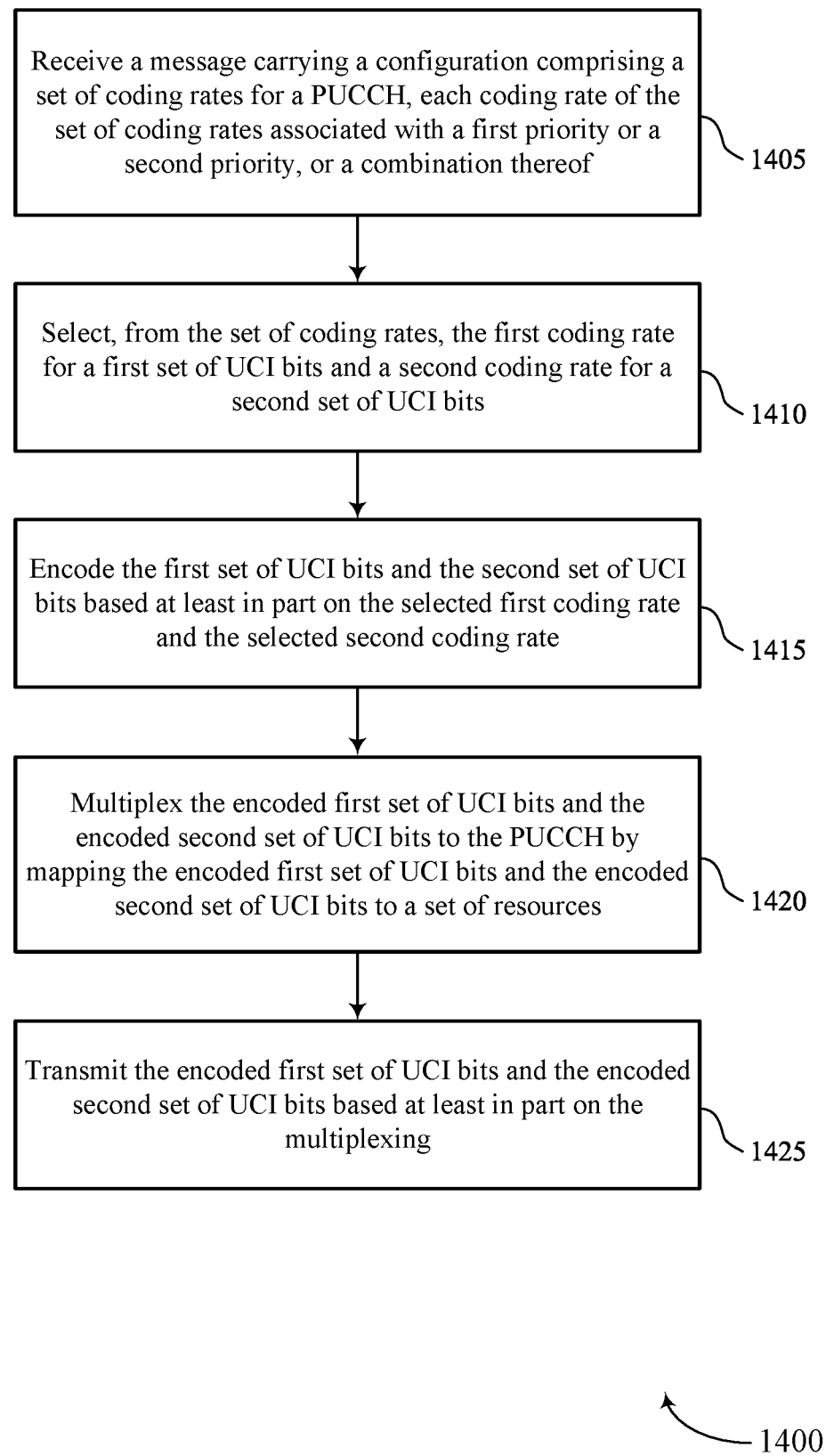

FIG. 14 shows a flowchart illustrating a method 1400 that supports multiplexing higher priority and lower priority UCI on a PUCCH in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a message carrying a configuration comprising a set of coding rates for a PUCCH, each coding rate of the set of coding rates associated with a first priority or a second priority, or a combination thereof. The operations of 1405 may be performed in accordance with examples as disclosed herein. In some examples, aspects of the operations of 1405 may be performed by a code rate component 740 as described with reference to FIG. 7.

At 1410, the method may include selecting, from the set of coding rates, the first coding rate for a first set of UCI bits and a second coding rate for a second set of UCI bits. The operations of 1410 may be performed in accordance with examples as disclosed herein. In some examples, aspects of the operations of 1410 may be performed by a code rate component 740 as described with reference to FIG. 7.

At 1415, the method may include encoding the first set of UCI bits and the second set of UCI bits based on the selected first coding rate and the selected second coding rate. The operations of 1415 may be performed in accordance with examples as disclosed herein. In some examples, aspects of the operations of 1415 may be performed by an encoder component 725 as described with reference to FIG. 7.

At 1420, the method may include multiplexing the encoded first set of UCI bits and the encoded second set of UCI bits to the PUCCH by mapping the encoded first set of UCI bits and the encoded second set of UCI bits to a set of resources. The operations of 1420 may be performed in accordance with examples as disclosed herein. In some examples, aspects of the operations of 1420 may be performed by a multiplexer component 730 as described with reference to FIG. 7.

At 1425, the method may include transmitting the encoded first set of UCI bits and the encoded second set of UCI bits based on the multiplexing. The operations of 1425 may be performed in accordance with examples as disclosed herein. In some examples, aspects of the operations of 1425 may be performed by an uplink component 735 as described with reference to FIG. 7.

Figure 15:
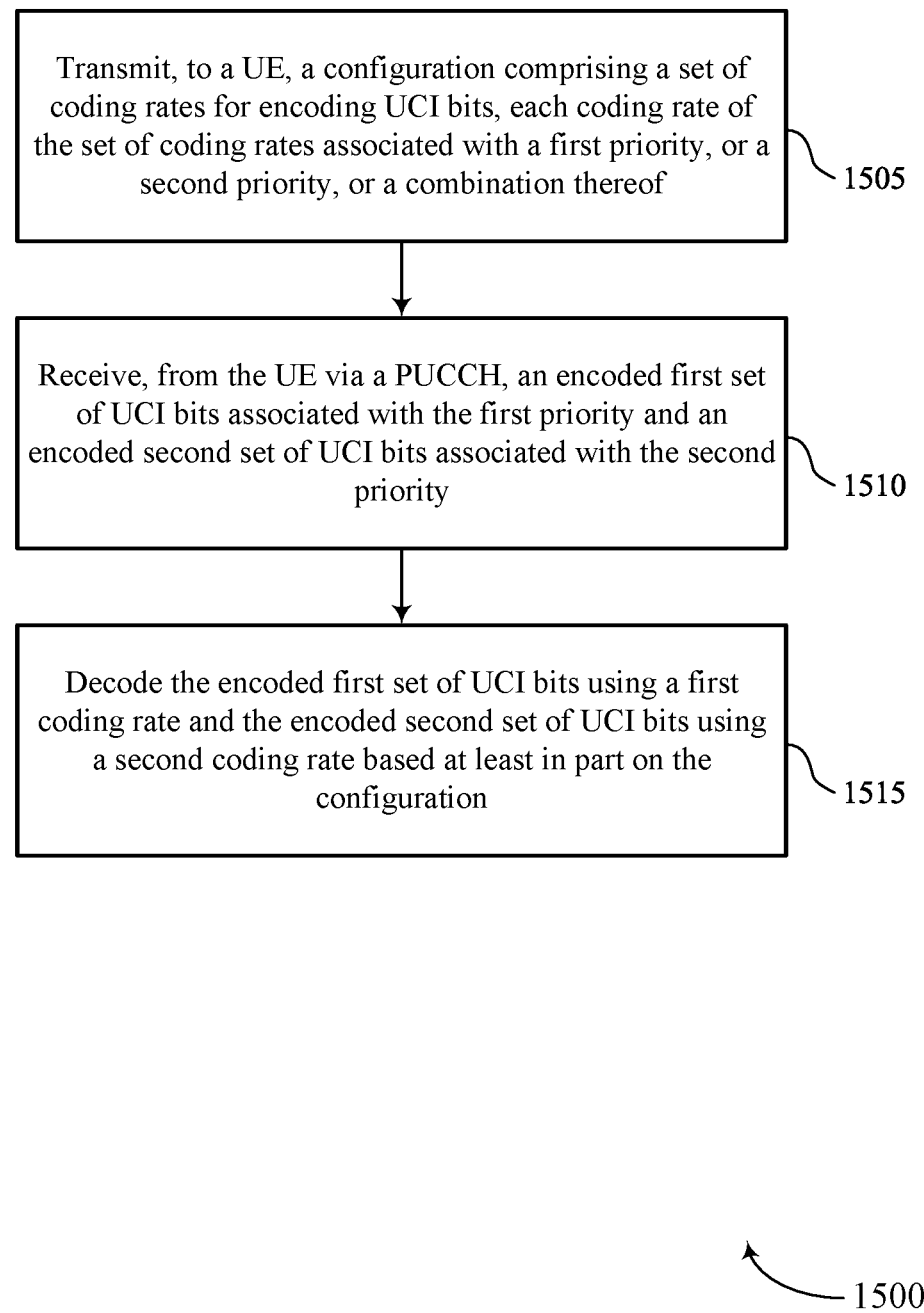

FIG. 15 shows a flowchart illustrating a method 1500 that supports multiplexing higher priority and lower priority UCI on a PUCCH in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a configuration including a set of coding rates for encoding UCI bits, each coding rate of the set of coding rates associated with a first priority, or a second priority, or a combination thereof. The operations of 1505 may be performed in accordance with examples as disclosed herein. In some examples, aspects of the operations of 1505 may be performed by a configuration component 1125 as described with reference to FIG. 11.

At 1510, the method may include receiving, from the UE via a PUCCH, an encoded first set of UCI bits associated with the first priority and an encoded second set of UCI bits associated with the second priority. The operations of 1510 may be performed in accordance with examples as disclosed herein. In some examples, aspects of the operations of 1510 may be performed by an uplink component 1130 as described with reference to FIG. 11.

At 1515, the method may include decoding the encoded first set of UCI bits using a first coding rate and the encoded second set of UCI bits using a second coding rate based on the configuration. The operations of 1515 may be performed in accordance with examples as disclosed herein. In some examples, aspects of the operations of 1515 may be performed by a decoder component 1135 as described with reference to FIG. 11.

The following provides an overview of aspects of the present disclosure:

Aspect 1: A method for wireless communication at a UE, comprising: encoding, based at least in part on a configuration, a first set of UCI bits using a first coding rate and a second set of UCI bits using a second coding rate, the first set of UCI bits associated with a first priority and the second set of UCI bits associated with a second priority; multiplexing the encoded first set of UCI bits and the encoded second set of UCI bits to a PUCCH by mapping the encoded first set of UCI bits and the encoded second set of UCI bits to a set of resources; and transmitting the encoded first set of UCI bits and the encoded second set of UCI bits based at least in part on the multiplexing.

Aspect 2: The method of aspect 1, further comprising: receiving a message carrying the configuration, wherein the configuration comprises a set of coding rates for the PUCCH, each coding rate of the set of coding rates associated with the first priority or the second priority, or a combination thereof; and selecting, from the set of coding rates, the first coding rate for the first set of UCI bits and the second coding rate for the second set of UCI bits, wherein encoding the first set of UCI bits and the second set of UCI bits is based at least in part on the selected first coding rate and the selected second coding rate.

Aspect 3: The method of aspect 2, wherein the set of coding rates comprises a first subset of coding rates for the first priority and a second subset of coding rates for the second priority.

Aspect 4: The method of aspect 3, wherein the first subset of coding rates is different than the second subset of coding rates.

Aspect 5: The method of any of aspects 2 through 4, further comprising: selecting, from the set of coding rates, the first coding rate for the first set of UCI bits, or the second coding rate for the second set of UCI bits, or a combination thereof, based at least in part on determining that a payload size of each of the first set of UCI bits and the second set of UCI bits satisfies a threshold payload size, the threshold payload size being less than or equal to 2 bits, wherein the first set of UCI bits and the second set of UCI bits comprise HARQ-ACK bits or SR bits, or a combination thereof.

Aspect 6: The method of any of aspects 2 through 5, further comprising: selecting, from the set of coding rates, the first coding rate for the first set of UCI bits or the second coding rate for the second set of UCI bits, or a combination thereof, based at least in part on determining that a payload size of each of the first set of UCI bits and the second set of UCI bits satisfies a threshold payload size, the threshold payload size being between 2 bits and 11 bits, wherein the first set of UCI bits and the second set of UCI bits comprise HARQ-ACK bits, SR bits, or CSI bits associated with a CSI part 1, or a combination thereof.

Aspect 7: The method of any of aspects 2 through 6, further comprising: selecting, from the set of coding rates, the first coding rate for the first set of UCI bits or the second coding rate for the second set of UCI bits, or a combination thereof, based at least in part on determining that a payload size of each of the first set of UCI bits and the second set of UCI bits satisfies a threshold payload size, the threshold payload size being greater than 11 bits, wherein the first set of UCI bits and the second set of UCI bits comprise CSI bits associated with a CSI part 2.

Aspect 8: The method of any of aspects 2 through 7, further comprising: selecting, from the set of coding rates, the first coding rate for the first set of UCI bits or the second coding rate for the second set of UCI bits, or a combination thereof, based at least in part on determining that a first payload size of the first set of UCI bits satisfies a first threshold payload size being greater than 11 bits, and second payload size of the second set of UCI bits satisfies a second threshold payload size, the second threshold payload size being greater than 2 bits and less than or equal to 11 bits, wherein the first set of UCI bits comprises HARQ-ACK bits, SR bits, or CSI bits associated with a CSI part 1, or a combination thereof, and the second set of UCI bits comprise CSI bits associated with a CSI part 2.

Aspect 9: The method of any of aspects 2 through 8, further comprising: selecting, from the set of coding rates, the first coding rate for the first set of UCI bits or the second coding rate for the second set of UCI bits, or a combination thereof, based at least in part on determining that a payload size of each of the first set of UCI bits and the second set of UCI bits satisfies a threshold payload size, the threshold payload size being less than or equal to 2 bits or being greater than 2 bits.

Aspect 10: The method of any of aspects 2 through 9, wherein the message comprises a radio resource control message, a medium access control-control element message, or a downlink control information message, or a combination thereof.

Aspect 11: The method of any of aspects 2 through 10, wherein the PUCCH corresponds to a PUCCH resource configured with multiple coding rates.

Aspect 12: The method of any of aspects 1 through 11, wherein the PUCCH corresponds to a PUCCH format comprising a PUCCH format 2, a PUCCH format 3, or a PUCCH format 4.

Aspect 13: The method of any of aspects 1 through 12, further comprising: determining a total number of uplink resources for the first set of UCI bits and the second set of UCI bits; and determining a number of resource blocks based on the total number of uplink resources for the first set of UCI bits and the second set of UCI bits, wherein multiplexing the encoded first set of UCI bits and the encoded second set of UCI bits to the PUCCH is based at least in part on the number of resource blocks.

Aspect 14: The method of any of aspects 1 through 13, further comprising: encoding an UCI bit of the first set of UCI bits using a repetition code based at least in part on the first coding rate; and transmitting the UCI bit, the UCI bit comprising a HARQ-ACK bit or a SR bit.

Aspect 15: The method of any of aspects 1 through 14, further comprising: multiplexing two UCI bits of the first set of UCI bits associated with the first priority with one or more UCI bits of the second set of UCI bits associated with the second priority; encoding the two UCI bits of the first set of UCI bits using a simplex code; repeating the simplex encoded two UCI bits based at least in part on the first coding rate; and transmitting the two UCI bits of the first set of UCI bits, the two UCI bits comprising HARQ-ACK bits or SR bits, or a combination thereof.

Aspect 16: The method of any of aspects 1 through 15, wherein encoding the first set of UCI bits and the second set of UCI bits comprises: separately encoding the first set of UCI bits using the first coding rate and the second set of UCI bits using the second coding rate different than the first coding rate based at least in part on an encoding rule identifying an encoding order.

Aspect 17: The method of any of aspects 1 through 16, wherein the first set of UCI bits and the second set of UCI bits comprises a set of HARQ-ACK bits, a set of SR bits, a first set of CSI bits associated with a CSI part 1, or a second set of CSI bits associated with a CSI part 2, or a combination thereof.

Aspect 18: The method of aspect 17, further comprising: separately encoding a first subset of UCI bits of the first set of UCI bits associated with the first priority and a second subset of UCI bits of the second set of UCI bits associated with the second priority based at least in part on an encoding rule, wherein the first subset of UCI bits and the second subset of UCI bits comprises HARQ-ACK bits, SR bits, CSI bits associated with a CSI part 1, or a combination thereof.

Aspect 19: The method of aspect 18, further comprising: separately encoding a third subset of UCI bits of the first set of UCI bits associated with the first priority, wherein the third subset of UCI bits comprises CSI bits associated with a CSI part 2.

Aspect 20: The method of aspect 19, further comprising: determining one or more resources of a set of resources associated with the PUCCH for each of the encoded first subset of UCI bits, the encoded second subset of UCI bits, and the encoded third subset of UCI bits; and mapping the encoded first subset of UCI bits, the encoded second subset of UCI bits, and the encoded third subset of UCI bits, to the set of resources associated with the PUCCH based at least in part on a resource mapping rule.

Aspect 21: The method of aspect 20, wherein the encoded first subset of UCI bits, the encoded second subset of UCI bits, and the encoded third subset of UCI bits are mapped in a contiguous order.

Aspect 22: The method of any of aspects 20 through 21, wherein the encoded first subset of UCI bits, the encoded second subset of UCI bits, and the encoded third subset of UCI bits are mapped in a noncontiguous order.

Aspect 23: The method of any of aspects 1 through 22, further comprising: determining a first uplink resource of the set of resources associated with a demodulation reference signal; and mapping the first set of UCI bits to a second uplink resource adjacent to the first uplink resource associated with the demodulation reference signal.

Aspect 24: The method of aspect 23, wherein the first uplink resource and the second uplink resource are contiguous in a time domain, or a frequency domain, or a combination thereof; and the first uplink resource is nonadjacent to a third uplink resource associated with the second set of UCI bits.

Aspect 25: The method of aspect 24, wherein the first uplink resource and the third uplink resource are non-contiguous in a time domain, or a frequency domain, or a combination thereof.

Aspect 26: The method of any of aspects 1 through 25, further comprising: determining that the PUCCH is scheduled with frequency hopping comprising at least two frequency hops; and mapping the encoded first set of UCI bits to both a first frequency hop and a second frequency hop of the at least two frequency hops.

Aspect 27: The method of aspect 26, further comprising: uniformly mapping the encoded first set of UCI bits to both the first frequency hop and the second frequency hop of the at least two frequency hops using the same number of resources or substantially the same number of resources for the first frequency hop and the second frequency hop.

Aspect 28: A method for wireless communication at a base station, comprising: transmitting, to a UE, a configuration comprising a set of coding rates for encoding UCI bits, each coding rate of the set of coding rates associated with a first priority, or a second priority, or a combination thereof; and receiving, from the UE via a PUCCH, an encoded first set of UCI bits associated with the first priority and an encoded second set of UCI bits associated with the second priority; and decoding the encoded first set of UCI bits using a first coding rate and the encoded second set of UCI bits using a second coding rate based at least in part on the configuration.

Aspect 29: An apparatus for wireless communication at a UE, comprising a processor; memory coupled with the processor; and instructions stored in the memory and executable by the processor to cause the apparatus to perform a method of any of aspects 1 through 27.

Aspect 30: An apparatus for wireless communication at a UE, comprising at least one means for performing a method of any of aspects 1 through 27.

Aspect 31: A non-transitory computer-readable medium storing code for wireless communication at a UE, the code comprising instructions executable by a processor to perform a method of any of aspects 1 through 27.

Aspect 32: An apparatus for wireless communication at a base station, comprising a processor; memory coupled with the processor; and instructions stored in the memory and executable by the processor to cause the apparatus to perform a method of aspect 28.

Aspect 33: An apparatus for wireless communication at a base station, comprising at least one means for performing a method of aspect 28.

Aspect 34: A non-transitory computer-readable medium storing code for wireless communication at a base station, the code comprising instructions executable by a processor to perform a method of aspect 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A user equipment (UE), comprising:
one or more memories storing processor-executable code; and
one or more processors coupled with the one or more memories and individually or collectively operable to execute the code to cause the UE to:
separately encode a first subset of uplink control information bits of a first set of uplink control information bits associated with a first priority and a second subset of uplink control information bits of a second set of uplink control information bits associated with a second priority;

multiplex the encoded first subset of uplink control information bits and the encoded second subset of uplink control information bits to a physical uplink control channel; and transmit the encoded first subset of uplink control information bits and the encoded second subset of uplink control information bits based at least in part on the multiplexing.

2. The UE of claim 1, wherein separately encoding the first subset of uplink control information bits and the second subset of uplink control information bits is based at least in part on an encoding rule.

3. The UE of claim 1, wherein the one or more processors are individually or collectively further operable to execute the code to cause the UE to:

map the encoded first subset of uplink control information bits and the encoded second subset of uplink control information bits to a set of resources, wherein multiplex the encoded first subset of uplink control information bits and the encoded second subset of uplink control information bits to a physical uplink control is based at least in part on the mapping.

4. The UE of claim 1, wherein the one or more processors are individually or collectively further operable to execute the code to cause the UE to:

separately encode a third subset of uplink control information bits of the first set of uplink control information bits associated with the first priority, wherein the third subset of uplink control information bits comprise channel state information bits associated with a channel state information part 2.

5. The UE of claim 4, wherein the one or more processors are individually or collectively further operable to execute the code to cause the UE to:

determine one or more resources of a set of resources associated with the physical uplink control channel for each of the encoded first subset of uplink control information bits, the encoded second subset of uplink control information bits, and the encoded third subset of uplink control information bits;

map the encoded first subset of uplink control information bits, the encoded second subset of uplink control information bits, and the encoded third subset of uplink control information bits, to a set of resources associated with the physical uplink control channel based at least in part on a resource mapping rule; and multiplex the encoded first subset of uplink control information bits and the encoded second subset of uplink control information bits, and the encoded third subset of uplink control information bits to the physical uplink control based at least in part on the mapping.

6. The UE of claim 5, wherein the encoded first subset of uplink control information bits, the encoded second subset of uplink control information bits, and the encoded third subset of uplink control information bits are mapped in a noncontiguous order.

7. The UE of claim 1, wherein the first subset of uplink control information bits and the second subset of uplink control information bits comprises hybrid automatic repeat request acknowledgment bits, scheduling request bits, channel state information bits associated with a channel state information part 1, or a combination thereof.

8. The UE of claim 4, wherein the first priority is greater than the second priority, and the one or more processors are individually or collectively further operable to execute the code to cause the UE to:

refrain from transmitting an encoded third subset of uplink control information bits based at least in part on the encoded third subset of uplink control information bits being associated with a third priority that is less than both the first priority and the second priority, and based at least in part on the encoded third subset of uplink control information bits comprising channel state information bits associated with a channel state information part 2.

9. The UE of claim 1, wherein multiplexing the encoded first subset of uplink control information bits and the encoded second subset of uplink control information bits to the physical uplink control channel is based at least in part on a quantity of resource blocks associated with a quantity of resources associated with the physical uplink control channel for each of the encoded first subset of uplink control information bits and the encoded second subset of uplink control information bits.

10. A network device, comprising:

one or more memories storing processor-executable code; and one or more processors coupled with the one or more memories and individually or collectively operable to execute the code to cause the network device to:

receive, via a physical uplink control channel, an encoded first set of uplink control information bits associated with a first priority and an encoded second set of uplink control information bits associated with a second priority; and separately decode the encoded first set of uplink control information bits and the encoded second set of uplink control information bits to identify a first subset of uplink control information bits of the encoded first set of uplink control information bits and a second subset of uplink control information bits of the encoded second set of uplink control information bits.

11. The network device of claim 10, wherein to separately decode the encoded first set of uplink control information bits and the encoded second set of uplink control information bits is based at least in part on a decoding rule.

12. The network device of claim 10, wherein the one or more processors are individually or collectively further operable to execute the code to cause the network device to:

separately decode a third subset of uplink control information bits of the encoded first set of uplink control information bits associated with the first priority, wherein the third subset of uplink control information bits comprise channel state information bits associated with a channel state information part 2.

13. The network device of claim 12, wherein the one or more processors are individually or collectively further operable to execute the code to cause the network device to:

demap the encoded first subset of uplink control information bits, the encoded second subset of uplink control information bits, and the encoded third subset of uplink control information bits based at least in part on a resource mapping rule, wherein to separately decode the encoded first set of uplink control information bits and the encoded second set of uplink control information bits is based at least in part on the demapping.

14. The network device of claim 13, wherein the encoded first subset of uplink control information bits, the encoded second subset of uplink control information bits, and the encoded third subset of uplink control information bits are demapped in a noncontiguous order.

15. The network device of claim 10, wherein the first subset of uplink control information bits and the second subset of uplink control information bits comprises hybrid automatic repeat request acknowledgment bits, scheduling request bits, channel state information bits associated with a channel state information part 1, or a combination thereof.

16. A method for wireless communication at a user equipment (UE), comprising:
- separately encoding a first subset of uplink control information bits of a first set of uplink control information bits associated with a first priority and a second subset of uplink control information bits of a second set of uplink control information bits associated with a second priority;
- multiplexing the encoded first subset of uplink control information bits and the encoded second subset of uplink control information bits to a physical uplink control channel; and
- transmitting the encoded first subset of uplink control information bits and the encoded second subset of uplink control information bits based at least in part on the multiplexing.

17. The method of claim 16, wherein separately encoding the first subset of uplink control information bits and the second subset of uplink control information bits is based at least in part on an encoding rule.

18. The method of claim 16, further comprising:
- mapping the encoded first subset of uplink control information bits and the encoded second subset of uplink control information bits to a set of resources,
- wherein multiplexing the encoded first subset of uplink control information bits and the encoded second subset of uplink control information bits to a physical uplink control information bits to a physical uplink control is based at least in part on the mapping.

19. The method of claim 16, further comprising:
- separately encoding a third subset of uplink control information bits of the first set of uplink control information bits associated with the first priority,
- wherein the third subset of uplink control information bits comprises channel state information bits associated with a channel state information part 2.

20. The method of claim 19, further comprising:
- determining one or more resources of a set of resources associated with the physical uplink control channel for each of the encoded first subset of uplink control information bits, the encoded second subset of uplink control information bits, and the encoded third subset of uplink control information bits;
- mapping the encoded first subset of uplink control information bits, the encoded second subset of uplink control information bits, and the encoded third subset of uplink control information bits, to a set of resources associated with the physical uplink control channel based at least in part on a resource mapping rule; and
- multiplexing the encoded first subset of uplink control information bits and the encoded second subset of uplink control information bits, and the encoded third subset of uplink control information bits to the physical uplink control based at least in part on the mapping.

* * * * *